(12) United States Patent
Chen et al.

(10) Patent No.: US 10,362,540 B2
(45) Date of Patent: Jul. 23, 2019

(54) METHODS FOR MONITORING PAGING MESSAGES WITH REDUCED POWER CONSUMPTION AND COMMUNICATIONS APPARATUSES UTILIZING THE SAME

(71) Applicant: MEDIATEK INC., Hsin-Chu (TW)

(72) Inventors: Hung-Yueh Chen, Taipei (TW); Shuang-An Chou, Keelung (TW); Bin-Ruei Wang, Taipei (TW); Wen-Hung Wu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/725,506

(22) Filed: Oct. 5, 2017

(65) Prior Publication Data

US 2018/0035380 A1 Feb. 1, 2018

Related U.S. Application Data

(63) Continuation-in-part of application No. 15/013,043, filed on Feb. 2, 2016, now Pat. No. 9,794,759, which
(Continued)

(51) Int. Cl.
*H04W 52/02* (2009.01)
*H04B 1/16* (2006.01)
(Continued)

(52) U.S. Cl.
CPC ...... *H04W 52/0245* (2013.01); *H04B 1/1615* (2013.01); *H04W 52/0216* (2013.01);
(Continued)

(58) Field of Classification Search
None
See application file for complete search history.

(56) References Cited

U.S. PATENT DOCUMENTS

| | | | |
|---|---|---|---|
| 5,978,366 | A | 11/1999 | Massingill et al. |
| 6,072,987 | A | 6/2000 | Willey |
| 6,115,407 | A | 9/2000 | Gendel et al. |
| 6,240,288 | B1 | 5/2001 | Wan et al. |
| 2001/0023184 | A1 | 9/2001 | Kalveram et al. |

(Continued)

FOREIGN PATENT DOCUMENTS

| | | |
|---|---|---|
| EP | 1 670 274 | 6/2006 |
| EP | 1 804 532 | 7/2009 |

*Primary Examiner* — Anh Ngoc M Nguyen
(74) *Attorney, Agent, or Firm* — McClure, Qualey & Rodack, LLP

(57) ABSTRACT

A method for monitoring paging messages in a mobile station with a subscriber identity card camping on a cell is provided. A paging message from the cell is monitored at a set of M predetermined time intervals. A first paging message with a first subscriber identity information being successively broadcasted in the paging channel at a Nth predetermined time interval and a (N+i)th predetermined time interval of the set of M predetermined time intervals is determined. A second paging message with a second subscriber identity information being successively broadcasted in the paging channel at the Nth predetermined time interval and a (N+j)th predetermined time interval of the set of M predetermined time intervals is determined, wherein j>i. The paging channel is monitored at a (N+i)th predetermined time interval and a (N+j)th predetermined time interval of following predetermined time intervals subsequent to the M predetermined time intervals.

8 Claims, 21 Drawing Sheets

Related U.S. Application Data is a continuation-in-part of application No. 12/627,246, filed on Nov. 30, 2009, now Pat. No. 9,264,914.

(51) Int. Cl.
  *H04W 68/02* (2009.01)
  *H04W 68/00* (2009.01)
  *H04B 1/715* (2011.01)

(52) U.S. Cl.
  CPC ....... *H04W 68/005* (2013.01); *H04W 68/025* (2013.01); *H04B 2001/7154* (2013.01); *Y02D 70/1224* (2018.01); *Y02D 70/1242* (2018.01); *Y02D 70/1262* (2018.01); *Y02D 70/146* (2018.01); *Y02D 70/24* (2018.01)

(56) References Cited

U.S. PATENT DOCUMENTS

| | | |
|---|---|---|
| 2003/0031140 A1 | 2/2003 | Oprescu-Surcobe et al. |
| 2004/0224728 A1 | 11/2004 | Dacosta et al. |
| 2006/0154677 A1 | 7/2006 | Kim |
| 2008/0084941 A1 | 4/2008 | Mohanty et al. |
| 2008/0108346 A1* | 5/2008 | Umatt ................ H04W 48/16 455/432.1 |
| 2009/0088154 A1* | 4/2009 | Umatt ................ H04W 48/16 455/434 |
| 2009/0215472 A1 | 8/2009 | Hsu |
| 2009/0323624 A1 | 12/2009 | Kim |
| 2010/0087210 A1* | 4/2010 | Lee ...................... H04W 68/00 455/458 |
| 2012/0307735 A1 | 12/2012 | Aghili et al. |

* cited by examiner

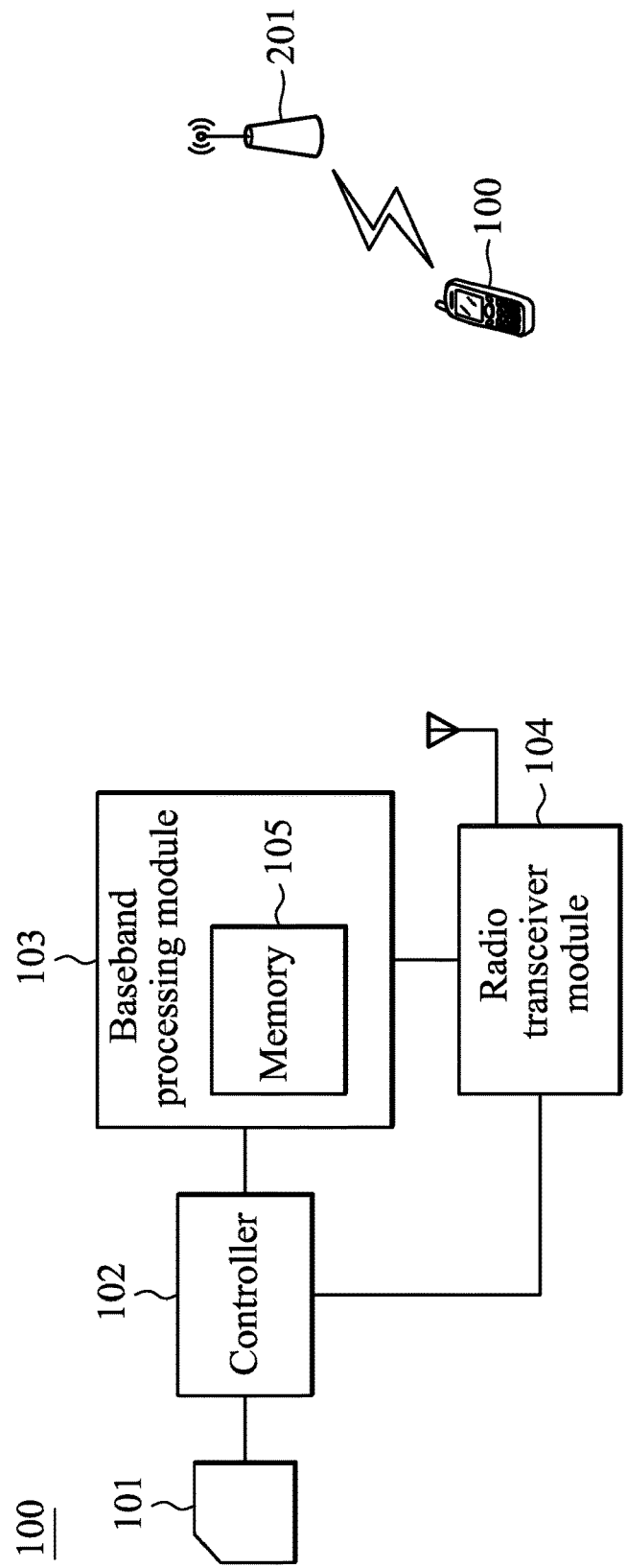

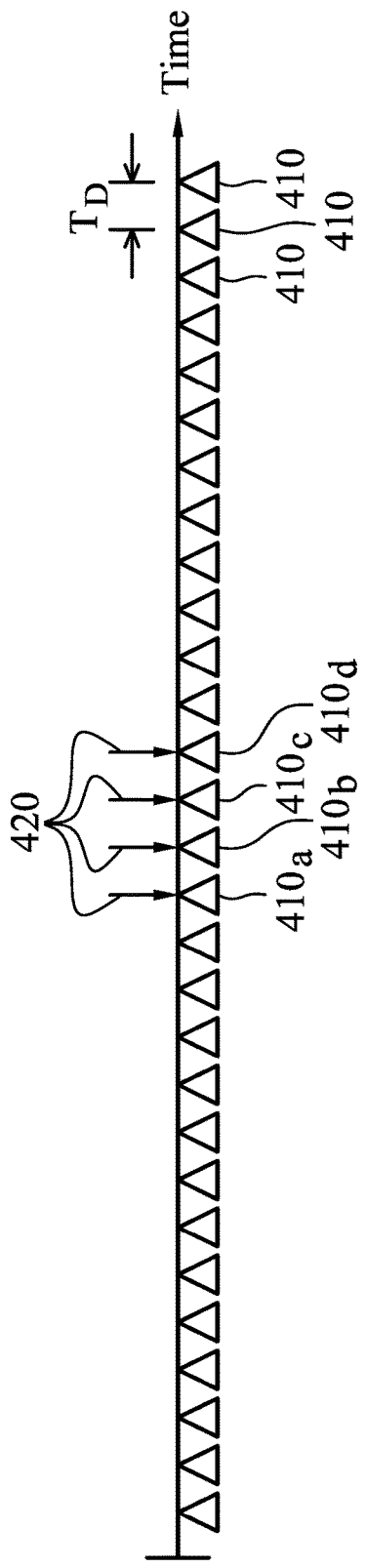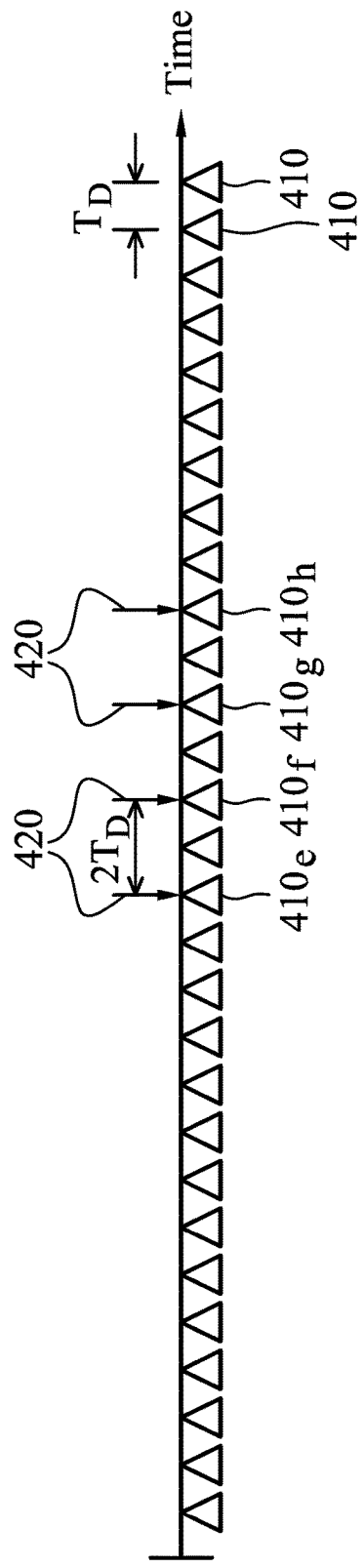
FIG. 4A
FIG. 4B

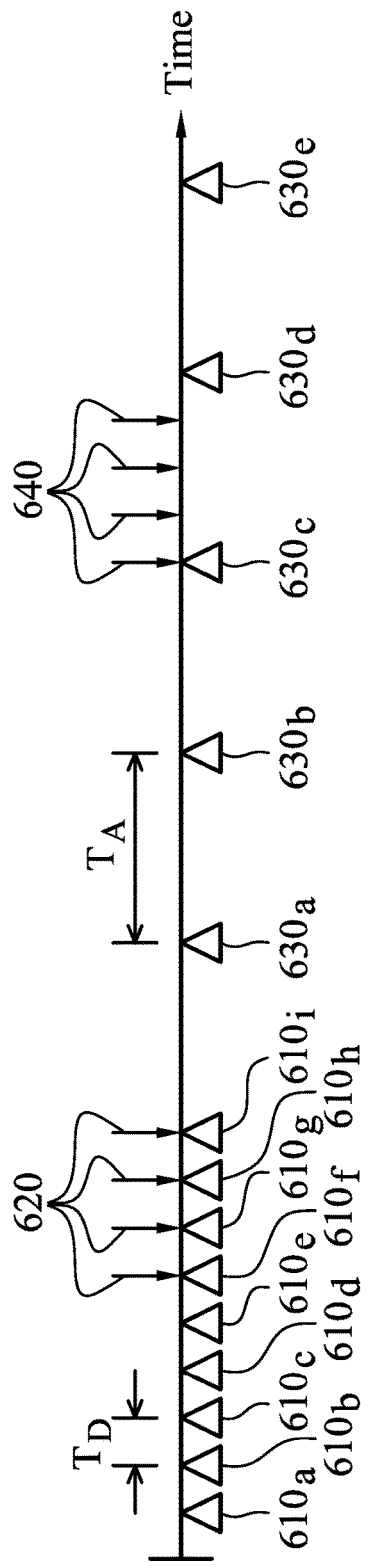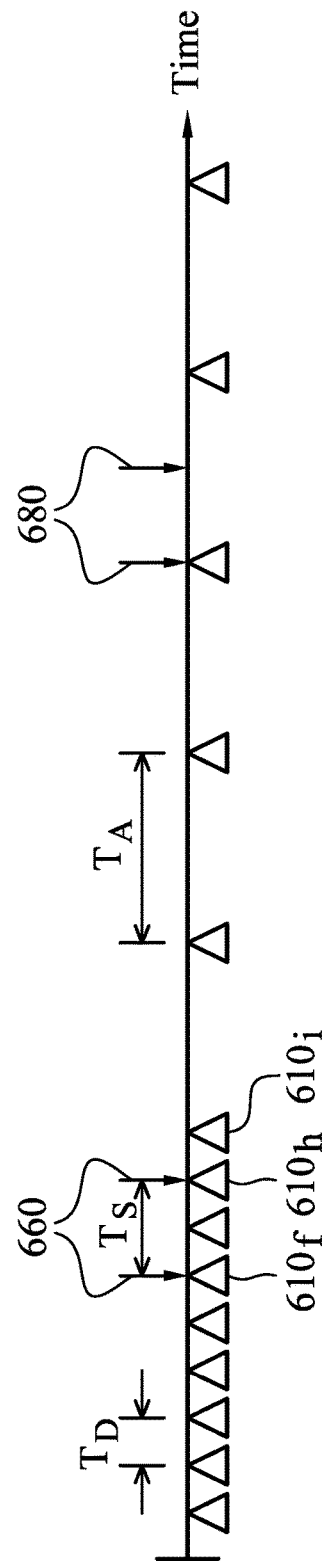

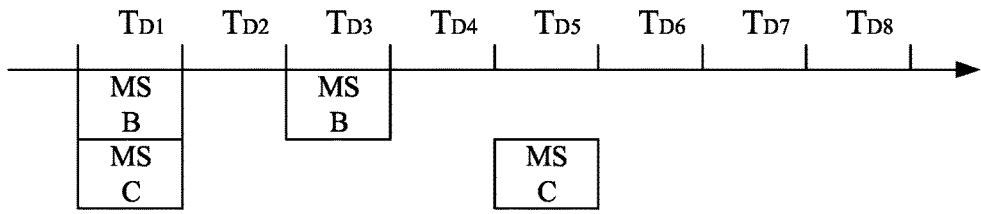
Monitoring in following predetermined time interval
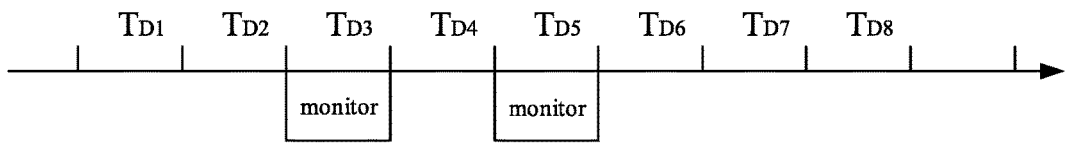
FIG.16
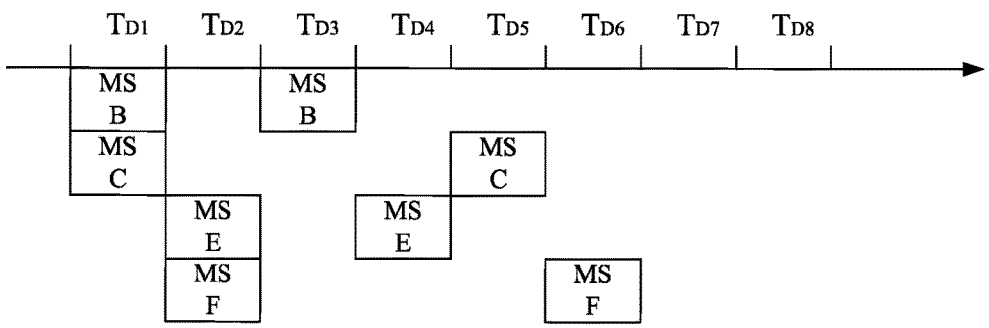
Monitoring in the following predetermined time interval
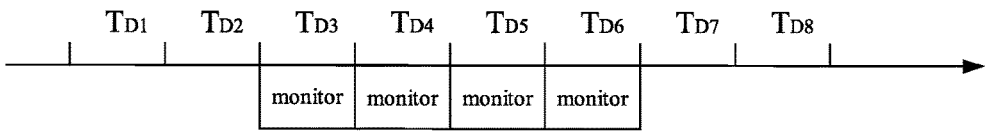
FIG.17A

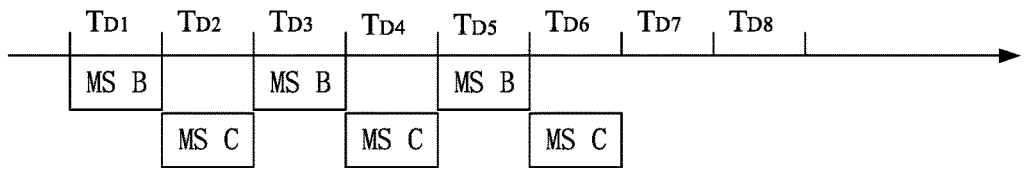
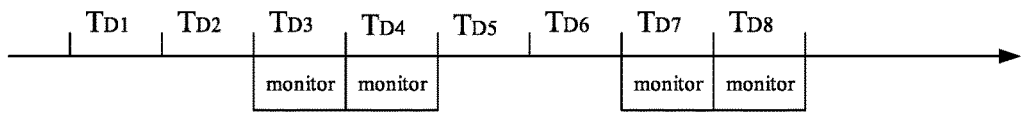
FIG.20
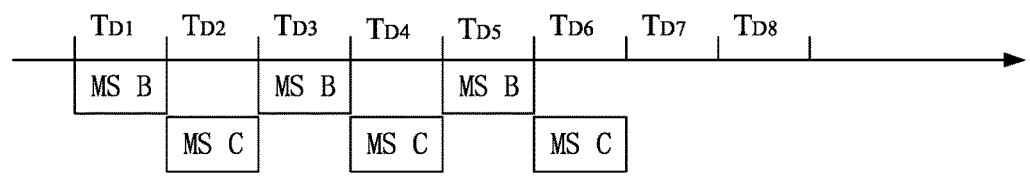
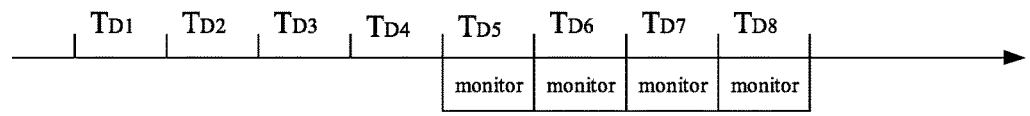
FIG.21
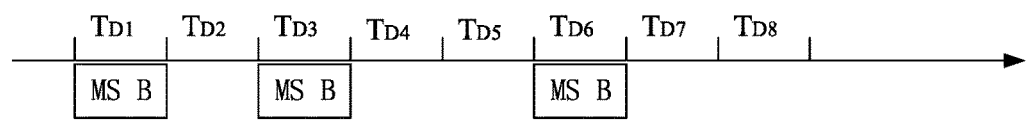
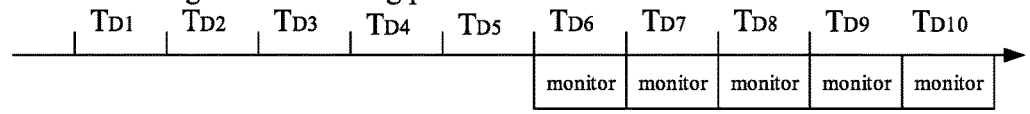
FIG.22

METHODS FOR MONITORING PAGING MESSAGES WITH REDUCED POWER CONSUMPTION AND COMMUNICATIONS APPARATUSES UTILIZING THE SAME

CROSS REFERENCE TO RELATED APPLICATIONS

This application is a Continuation-In-Part of U.S. patent application Ser. No. 15/013,043, filed on Feb. 2, 2016, which is a Continuation-In-Part of U.S. patent application Ser. No. 12/627,246 filed on Nov. 30, 2009 (now U.S. Pat. No. 9,264,914, issued on Feb. 16, 2016), the entirety of which are incorporated by reference herein.

BACKGROUND OF THE INVENTION

Field of the Invention

The present invention is related to a wireless communications apparatus, and more particularly to a wireless communications apparatus for monitoring paging messages with reduced power consumption.

Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many worldwide location. They can be used anywhere, as long as there is a cellular telephone site to house equipment that can transmit and receive signals, which are processed to transfer both voice and data to and from the cellular telephones.

There are various well-developed and well-defined cellular communication technologies. As an example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard, which uses code division multiple access (CDMA) technology. The UMTS (Universal Mobile Telecommunications System) is a 3G mobile communications system, which provides an enhanced range of multimedia services over the 2G GSM system. Other emerging radio access technology (RAT), such as Time Division-Synchronous Code Division Multiple Access (TD-SCDMA), Worldwide Interoperability for Microwave Access (WiMAX), long term evolution (LTE), or others, is still developed.

For various cellular communication technologies, listening to paging channels, paging indicator channels or others, in idle mode to obtain paging messages consumes certain amount of battery power and may hinder data transceiving in Packet-switched (PS) domain. Therefore, a method for smart monitoring paging messages in an MS is desired.

BRIEF SUMMARY OF THE INVENTION

Methods for monitoring paging messages with reduced power consumption and communications apparatuses utilizing the same are provided. An embodiment of a method for monitoring paging messages in a mobile station with a subscriber identity card camping on a cell is provided. A paging message from the cell is monitored at a set of M predetermined time intervals. A first paging message with a first subscriber identity information being successively broadcasted in the paging channel at a Nth predetermined time interval and a (N+i)th predetermined time interval of the set of M predetermined time intervals is determined. A second paging message with a second subscriber identity information being successively broadcasted in the paging channel at the Nth predetermined time interval and a (N+j)th predetermined time interval of the set of M predetermined time intervals is determined, wherein j>i. The paging channel is monitored at a (N+i)th predetermined time interval and a (N+j)th predetermined time interval of following predetermined time intervals subsequent to the M predetermined time intervals.

Furthermore, another method for monitoring paging messages with reduced power consumption and communications apparatuses utilizing the same is provided. An embodiment of a method for monitoring paging messages in a mobile station with a subscriber identity card camping on a cell is provided. A paging message with a same subscriber identity information being successively broadcasted in the paging channel at a Nth predetermined time interval, a (N+i)th predetermined time interval and (N+j)th predetermined time interval of the set of M predetermined time intervals is determined. A specific monitoring time is selected from a first monitoring time and a second monitoring time, wherein the first monitoring time has i continuous predetermined time intervals, and the second monitoring time has j continuous predetermined time intervals. The paging channel is monitored at the specific monitoring time for following predetermined time interval subsequent to the M predetermined time intervals, wherein the number of predetermined time intervals in a specific sleep interval is equal to the number of predetermined time intervals in the specific monitoring time.

Furthermore, another method for monitoring paging messages with reduced power consumption and communications apparatuses utilizing the same is provided. An embodiment of a method for monitoring paging messages in a mobile station with a subscriber identity card camping on a cell is provided. The paging channel is monitored at a set of M predetermined time intervals. A paging message with a same subscriber identity information being successively broadcasted in the paging channel at a Nth predetermined time interval, a (N+i)th predetermined time interval and (N+j)th predetermined time interval of the set of M predetermined time intervals is determined. A first monitoring time alternating with a first virtual sleeping time, and a second monitoring time alternating with a second virtual sleeping time are determined, wherein the number of continuous predetermined time intervals of the first monitoring time and the first virtual sleeping time is i, and the number of continuous predetermined time intervals of the second monitoring time and the second virtual sleeping time is j. The paging channel is monitored at the first monitoring time and the second monitoring time for following predetermined time interval subsequent to the M predetermined time intervals.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 1 shows a communications apparatus for monitoring paging messages with reduced power consumption according to an embodiment of the invention;

FIG. 2 shows an exemplary network topology according to an embodiment of the invention;

FIG. 4A shows a schematic diagram illustrating an exemplary distribution of paging occasions at which a communications apparatus listens to and paging messages broadcasted from a cell served by a first network operator that the communications apparatus has camped on;

FIG. 4B shows a schematic diagram illustrating another exemplary distribution of paging occasions at which the communications apparatus listens to and paging messages broadcasted from a cell served by a second network operator that the communications apparatus has camped on;

FIG. 6A shows a schematic diagram illustrating an exemplary distribution of paging occasions at which the mobile station listens to and paging messages broadcasted from the cell that the mobile station has camped on;

FIG. 6B shows a schematic diagram illustrating another exemplary distribution of paging occasions at which the mobile station listens to and paging messages broadcasted from the cell that the mobile station has camped on;

FIG. 8 shows a schematic diagram illustrating an exemplary distribution of paging occasions of the mobile station at which the mobile station listens to and paging messages broadcasted from the cell that the mobile station has camped on.

FIG. 12 shows a schematic diagram illustrating an exemplary distribution of paging occasions at which the mobile station listens to paging messages broadcasted from the cell that the mobile station has camped on.

FIG. 14 shows another schematic diagram illustrating an exemplary distribution of paging occasions at which the mobile station listens to paging messages broadcasted from the cell that the mobile station has camped on.

FIG. 16 shows schematic diagrams illustrating an exemplary distribution of paging occasions at which the mobile station listens to paging messages broadcasted from the cell that the mobile station has camped on.

FIG. 17A shows schematic diagrams illustrating an exemplary distribution of paging occasions at which the mobile station listens to paging messages broadcasted from the cell that the mobile station has camped on.

FIG. 17B shows schematic diagrams illustrating an exemplary distribution of paging occasions at which the mobile station listens to paging messages broadcasted from the cell that the mobile station has camped on.

FIG. 20 shows schematic diagrams illustrating an exemplary distribution of paging occasions at which the mobile station listens to paging messages broadcasted from the cell that the mobile station has camped on.

FIG. 21 shows schematic diagrams illustrating an exemplary distribution of paging occasions at which the mobile station listens to paging messages broadcasted from the cell that the mobile station has camped on.

FIG. 22 shows schematic diagrams illustrating an exemplary distribution of paging occasions at which the mobile station listens to paging messages broadcasted from the cell that the mobile station has camped on.

FIG. 24 shows schematic diagrams illustrating an exemplary distribution of paging occasions at which the mobile station listens to paging messages broadcasted from the cell that the mobile station has camped on.

DETAILED DESCRIPTION OF THE INVENTION

Figure 3:
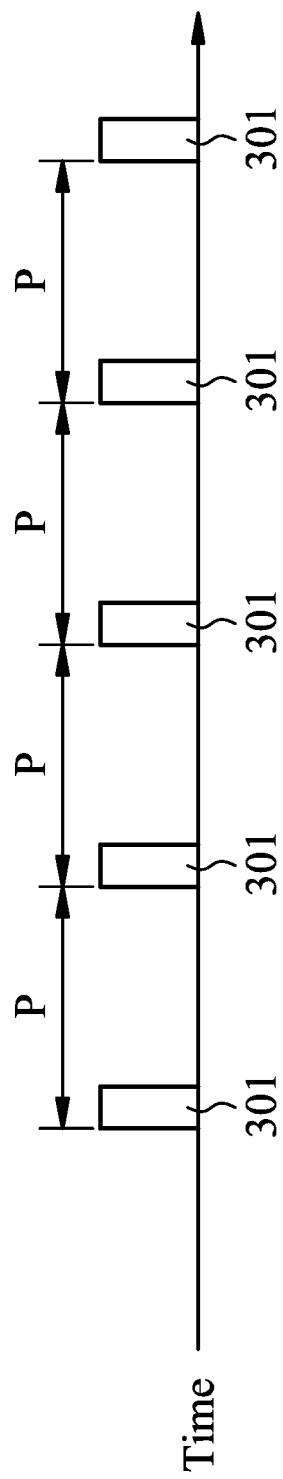
FIG. 3 shows an exemplary distribution of paging occasions and the corresponding paging periods along the time axis.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a communications apparatus 100 for monitoring paging messages with reduced power consumption according to an embodiment of the invention. The communications apparatus 100 comprises a subscriber identity card 101, a controller 102, a baseband processing module 103, and a radio transceiver module 104, wherein the controller 102 is coupled to the radio transceiver module 104, the subscriber identity card 101 and the baseband processing module 103 for controlling the operations thereof. FIG. 2 shows an exemplary network topology according to an embodiment of the invention. The communications apparatus 100 may communicate with a wireless network through a cell belonging to the wireless network, and camp on the cell via the radio transceiver module 104, where the cell may be covered by a Node B 201 (or also known as a Global System for Mobile communications, GSM base station, a Worldwide Interoperability for Microwave Access, WiMAX advanced base station, a long term evolution, LTE enhanced base station, or others), as shown in FIG. 2.

Referring to FIG. 1 and FIG. 2 together, the radio transceiver module 104 receives wireless radio frequency signals from the cell 201 of the wireless network, converts the received signals to baseband signals to be processed by the baseband processing module 103, or receives baseband signals from the baseband processing module 103 and converts the baseband signals to wireless radio frequency signals to be transmitted to a peer device. The radio transceiver module 104 may comprise a plurality of hardware devices to perform radio frequency conversion. For example, the radio transceiver module 104 may comprises a mixer to multiply the baseband signals with a carrier oscillated in the radio frequency of the wireless communication system for transmission, wherein the radio frequency may be, for example, 1900 MHz for a W-CDMA system. When the radio transceiver module 104 receives the wireless radio frequency signals from the cell 201 of the wireless network, the mixer recovers the received signal into baseband signals, and the baseband processing module 103 converts the baseband signals to a plurality of digital signals and processes the digital signals. The baseband processing module 103 may also comprise a plurality of hardware devices to perform baseband signal processing. The baseband signal processing procedure may comprise analog to digital conversion (ADC)/digital to analog conversion (DAC), gain adjustment, modulation/demodulation, encoding/decoding, and so on. The subscriber identity card 101 may record a plurality of user information and the controller 102 may read data from the plugged in subscriber identity card 101 and write data thereto. Note that it is also feasible to integrate the controller 102 into the baseband processing module 103.

According to an embodiment of the invention, the subscriber identity card 101 may relate to one kind of wireless communication system. For example, the subscriber identity card 101 may be a subscriber identity module (SIM) card of a Global System for Mobile communication (GSM), a universal subscriber identity module (USIM) card of a Universal Mobile Telecommunications System (UMTS), or a removable user identity module (RUIM) card or a CDMA Subscriber Identity Module (CSIM) card of a CDMA2000 system, or others. For example, the SIM/USIM card stores user account information, international mobile subscriber identity (IMSI), authentication information and a set of SIM/USIM Application Toolkit (SAT/USAT) commands and provides storage space for text messages and phone book contacts. The controller 102 may interact with a MCU of the SIM/USIM card to fetch data or SAT commands from the plugged in SIM/USIM card.

In the communication systems such as the GSM, UMTS, General Packet Radio Service (GPRS), CDMA 2000, Time Division-Synchronous Code Division Multiple Access (TD-SCDMA), WiMAX, LTE communication system, the communications apparatus, also known as a mobile station (MS) or user equipment (UE), may use discontinuous reception (DRX) during an idle mode to reduce power consumption after camping on a cell. In an idle mode, the communications apparatus 100 searches for or measures a Broadcast Control Channel (BCCH) which has the best signal quality from a base station provided by a specific network operator, or synchronized to the BCCH of a specific base station, ready to perform a random access procedure on the Random Access Channel (RACH) when requesting for a dedicated channel. In a dedicated mode, the communications apparatus 100 occupies a physical channel and tries to synchronize therewith. Also, the communications apparatus 100 establishes logical channels and switches therebetween.

When a DRX is used, the base station or Node B (e.g. 201 of FIG. 2) may transmit paging messages or paging indicator messages periodically at paging occasions. Thus, the communications apparatus 100 is required to receive the paging messages carried in the paging channel (PCH) bursts at the paging occasions or the paging indicator messages carried in the paging indicator channel (PICH) bursts at the corresponding radio frames of the paging occasions. When the paging indicator corresponding to the communications apparatus 100 is received, the communications apparatus 100 is required to further receive the paging messages carried in the secondary common control physical channels (S-CCPCH) bursts. The communications apparatus 100 periodically monitors the PCH/S-CCPCH to avoid mobile terminated (MT) call lost, where the monitoring moments are referred to as paging occasions. The PICH is a common, time-shared indication channel used to inform the communications apparatus 100 whether a following PCH channel is required to be received. FIG. 3 shows an exemplary distribution of paging occasions 301 and the corresponding paging periods P along the time axis. As FIG. 3 shows, during the DRX cycle, each MS performing a power saving operation may wake up at its own paging occasions 301 to check up on paging messages. After receiving the paging message, the communications apparatus 100 my decide whether to sleep again by checking the Page Indicator (PI) in the paging message. If the paging indicator reveals that the communications apparatus 100 is now being paged, the communications apparatus 100 may initiate a procedure to receive an incoming call. Otherwise, the communications apparatus 100 may sleep again and wake up at a next paging occasion.

FIG. 4A shows a schematic diagram illustrating an exemplary distribution of paging occasions 410 at which a communications apparatus listens to and paging messages 420 broadcasted from a cell (e.g. 201 of FIG. 2) served by a first network operator that the communications apparatus has camped on. As shown in FIG. 4A, the communications apparatus monitors the PCH at every paging occasion 410, wherein a period of the paging occasions 410 is a predetermined time interval $T_D$. The predetermined time interval $T_D$ is determined according a plurality of multiframes, wherein each of the multiframes is formed consisting of 51 consecutive Time division multiple access (TDMA) frames. The cell served by the first network operator transmits paging messages at paging occasions when another device (e.g. mobile phone, telephone, or others) attempts to connect to the communications apparatus for subsequent data transceiving. As shown in FIG. 4A, the cell may send paging message 420 four times successively at the paging occasions $410_a$, $410_b$, $410_c$, and $410_d$ to page the communications apparatus to avoid paging message loss due to bad channel quality. FIG. 4B shows a schematic diagram illustrating another exemplary distribution of paging occasions 410 at which the communications apparatus listens to and paging messages 420 broadcasted from a cell served by a second network operator that the communications apparatus has camped on. As shown in FIG. 4B, the four paging messages 420 from the cell are broadcasted at the paging occasions $410_e$, $410_f$, $410_g$ and $410_h$ to page the communications apparatus. Compared to FIG. 4A, the cell served by the second network operator doubles the time interval to re-transmit the paging message 420 in FIG. 4B. For example, after broadcasting the paging message 420 at the paging occasion $410_e$, the cell broadcasts the paging message 420 at the paging occasion $410_f$. As shown in FIG. 4B, the cell served by the second network operator transmits the paging message 420 periodically according to a period substantially equal to two predetermined time intervals $T_D$.

Figure 5:
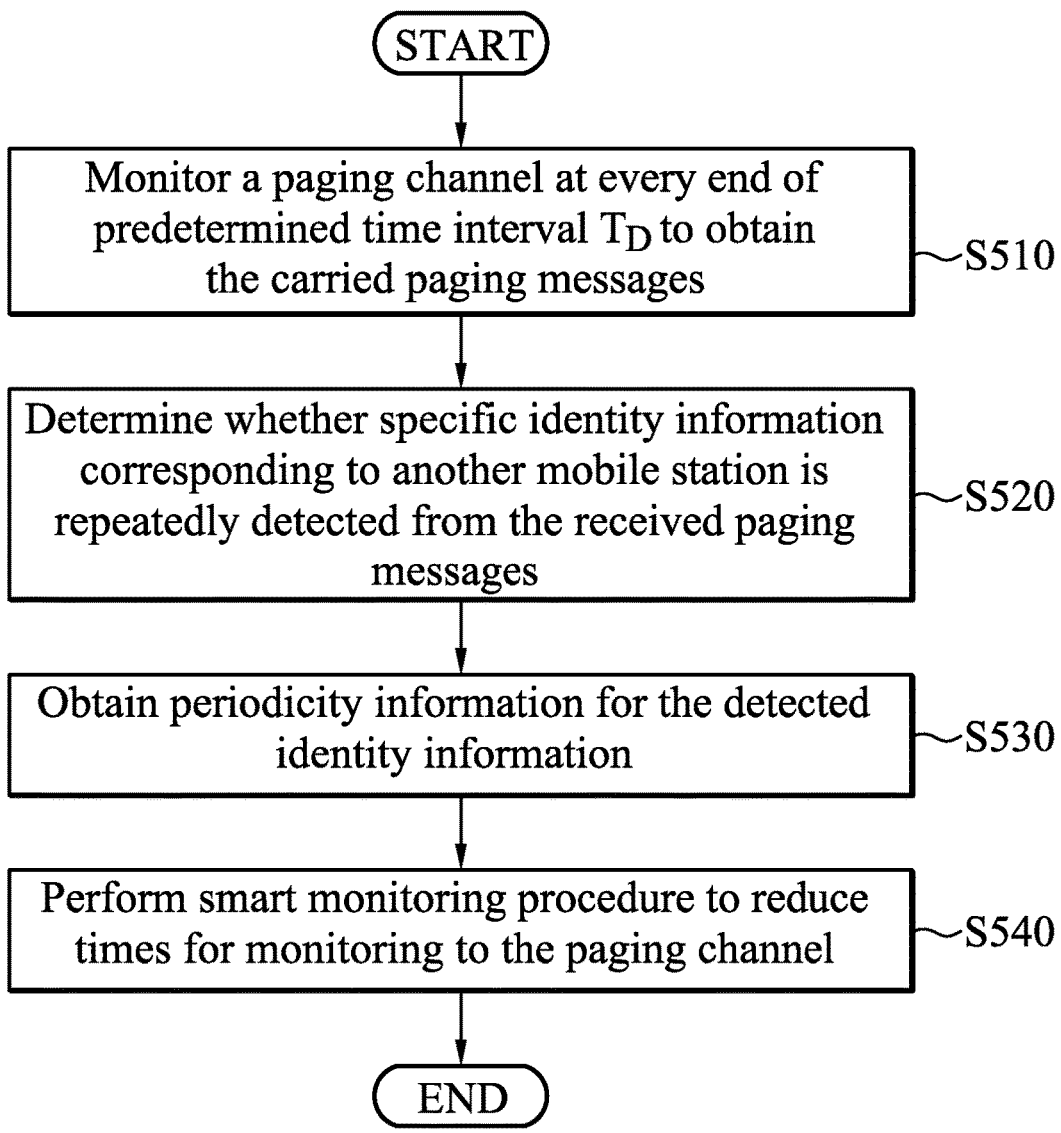
FIG. 5 shows a method for monitoring paging messages with reduced power consumption according to an embodiment of the invention.

FIG. 5 shows a method for monitoring paging messages with reduced power consumption according to an embodiment of the invention. The method is performed by a mobile station (e.g. 100 of FIGS. 1 and 2) with a subscriber identity card camping on a cell (e.g. 201 of FIG. 2). First, the mobile station monitors/listens to a paging channel (e.g. PCH or S-CCPCH) at every end of predetermined time interval $T_D$ subsequent to the last monitored time (step S510) to obtain the carried paging messages, wherein the mobile station receives the paging message via a radio transceiver module thereof (e.g. 104 of FIG. 1). Next, a baseband processing module of the mobile station (e.g. 103 of FIG. 1) determines whether specific identity information corresponding to another mobile station is repeatedly detected from the received paging messages (step S520). It is to be understood that delivering of a paging message through the paging channels more than one time can diminish the possibility of MT call lost. Next, periodicity information for the detected identity information is obtained (step S530). The periodicity information may indicate a time period between two successive paging messages containing the same identity information and the total number of the paging messages containing the same identity information. As an example, as shown in FIG. 4A, when the same identity information corresponding to a mobile station is carried by the paging messages 420 at paging occasions 410a to 410d, the obtained time period is $T_D$ and the total number is four. As another example, as shown in FIG. 4B, the obtained time period is $2 \times T_D$ and the total number is four when the same identity information is carried by the paging messaging 420 at paging occasions 410e to 410h. Next, the mobile station performs a smart monitoring procedure to reduce times for monitoring/listening to the paging channel or stay in the sleep mode at determined paging occasions to save battery power consumption (step S540). That is, the smart monitoring procedure listens to the paging channel less frequently than original configuration. For example, the mobile station wakes up to listen to the paging channel at every end of time interval $T_A$ subsequent to the last monitored time, where $T_A$ is longer than the predetermined time intervals $T_D$. In order to prevent paging message loss, the time interval $T_A$ does not exceed the obtained total number multiplying by the obtained time period between two successive paging messages. Furthermore, the method may also be implemented in other advanced communications systems, such as a Worldwide Interoperability for Microwave Access (WiMAX) system, a Long Term Evolution (LTE) system, a Time Division-Synchronous Code Division Multiple Access (TD-SCDMA) system, and so on.

General Packet Radio Service (GPRS) has been developed in GSM/WCDMA/TD-SCDMA networks. GPRS provides wireless access to packet data networks. Networks based on the Internet Protocol (IP) (e.g. the global Internet or private/corporate intranets) and X.25 networks are supported. Before a mobile station can use the GPRS service, the mobile station attaches to the GPRS network. An ATTACH REQUEST message of the mobile station is sent to a Serving GPRS Support Node (SGSN). The GPRS network then checks if the mobile station is authorized, copies the user profile from the Home Location Register (HLR) to the SGSN, and assigns a Packet Temporary Mobile Subscriber Identity (P-TMSI) to the mobile station. The described procedure is called GPRS Attach. To exchange data packets with external Public Data Networks (PDNs) after a successful GPRS Attach, the mobile station applies for an address used in the PDN. The address is called a Packet Data Protocol (PDP) address. In the case where the PDN is an IP network, the PDP address is an IP address. For each session, a so-called PDP context is created, which describes the characteristics of the session. The PDP context describes the PDP type (e.g. IPv4, IPv6 or others), the PDP address assigned to a mobile station, the requested Quality of Service (QoS) class and the address of a Gateway GPRS Support Node (GGSN) that serves as the access point to the external network. It is to be understood that, when camping on a GSM cell, the mobile station must stops transmitting and receiving data packets using the GPRS service for listening to a paging channel at each paging occasion. The smart monitoring procedure as shown in step S550 may be performed to reduce interruption of data transceiving, yielding a higher throughput rate.

Take simulated situations below as examples to illustrate the method of FIG. 5, FIG. 6A shows a schematic diagram illustrating an exemplary distribution of paging occasions at which the mobile station listens to and paging messages broadcasted from the cell that the mobile station has camped on. Before activating the smart monitoring procedure, the mobile station obtains periodicity information by listening to the PCH/S-CCPCH at the paging occasions $610_a$-$610_i$. In this situation, the mobile station detects the same identity information from four paging messages 620 at successive paging occasions and accordingly determines periodicity information indicating that a time period between two successive paging messages is $T_D$ and a total number of redundant paging messages is four. Thereafter, the mobile station performs a smart monitoring procedure to listen to the PCH/S-CCPCH at every end of time interval $T_A$ subsequent to the last monitored time, causing broadcasted paging messages to be obtained at the paging occasions $630_a$, 630b, 630c, 640d, and $630_e$. The time interval $T_A$ is four times the length of the predetermined time interval $T_D$ (i.e. $4T_D$). The time period from the beginning to the paging occasion 610i shown in FIG. 6A may refer to as a training period for obtaining the time interval $T_A$ and accordingly determining whether to start the smart monitoring procedure.

FIG. 6B shows a schematic diagram illustrating another exemplary distribution of paging occasions at which the mobile station listens to and paging messages broadcasted from the cell that the mobile station has camped on. Before activating the smart monitoring procedure, the mobile station obtains periodicity information at the paging occasions $610_f$ and $610_h$, and recognizes a time period between two successive paging messages is $T_s = 2 \times T_D$, and a total number of redundant paging messages is two. Thereafter, the mobile station performs a smart monitoring procedure to listen to the PCH less frequently. Specifically, the mobile station monitors the PCH/S-CCPCH at every end of time interval $T_A$ subsequent to the last monitored time, causing broadcasted paging messages to be obtained at the paging occasions $630_a$, 630b, 630c, 640d, and $630_e$. The time interval $T_A$ is four times the length of the predetermined $T_D$ (i.e. $4T_D$). The time period from the beginning to the paging occasion 610i shown in FIG. 6B may also refer to as a training period.

Figure 7:
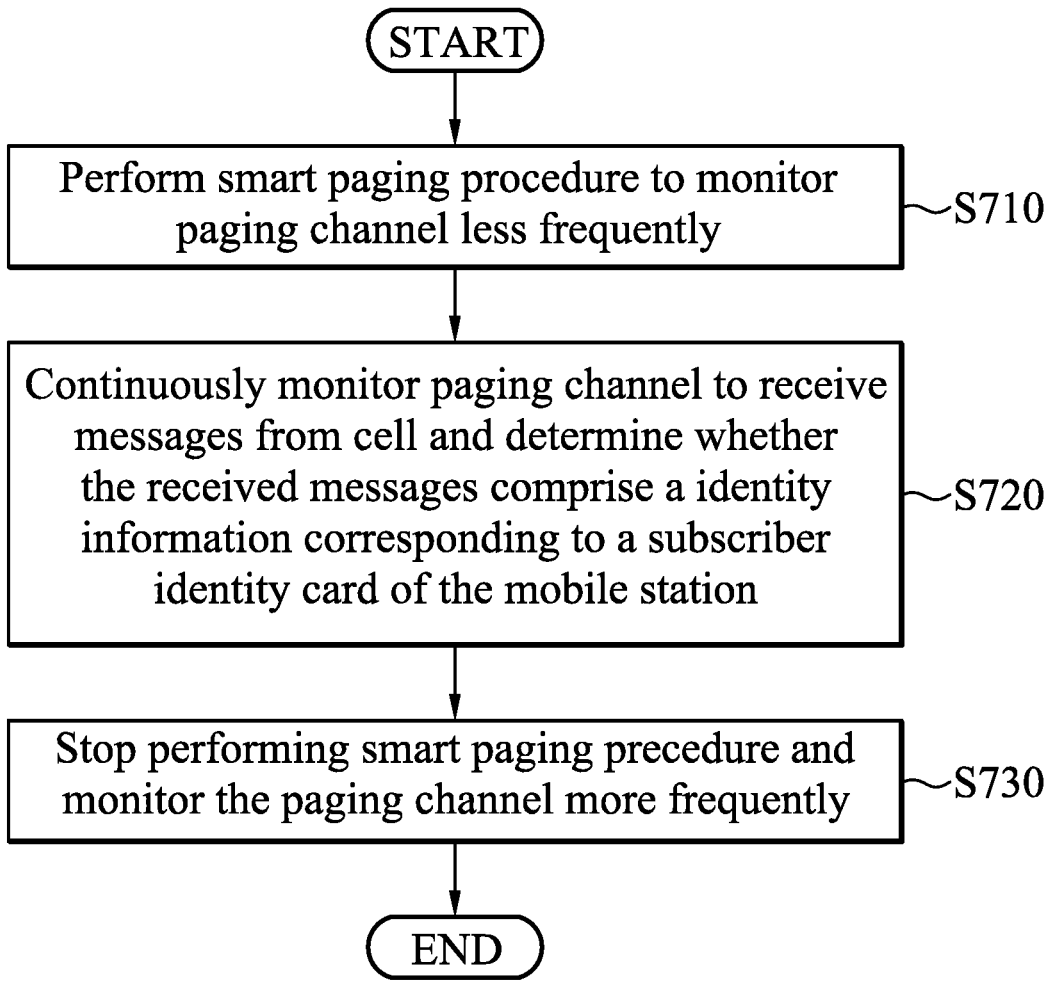
FIG. 7 shows a method for monitoring paging messages with reduced power consumption according to another embodiment of the invention.

FIG. 7 shows a method for monitoring paging messages with reduced power consumption according to an embodiment of the invention. The method is performed by a mobile station (e.g. 100 of FIGS. 1 and 2) with a subscriber identity card camped on a cell (e.g. 201 of FIG. 2). First, the mobile station performs a smart monitoring procedure to monitor/listen to a paging channel less frequently (step S710). As described above, when the smart monitoring procedure is performed, the mobile station monitors the paging channel at every end of time interval $T_A$ subsequent to the last monitored time, where the time interval $T_A$ is a period longer than the predetermined time interval $T_D$. Next, the mobile station continuously monitors the paging channel to receive the broadcasted messages from the cell and determines whether the received messages comprise identity information corresponding to the equipped subscriber identity card of the mobile station until a specific condition is satisfied (step S720). The specific condition indicates that the broadcasted message carried by the paging channel may be interfered due to bad quality of the air interface. Next, when determining that the specific condition is satisfied, the mobile station stops performing the smart monitoring procedure (step S730), i.e. the paging channel is monitored at every end of predetermined time interval $T_D$ subsequent to the last monitored time.

In an embodiment, the specific condition is determined according to an air interface condition between the mobile station and the cell. For example, a downlink signaling failure counter (DSC) or the received signal strength is used to estimate the air interface condition between the mobile station and the cell. The DSC is a counter which is increased by 1 when the received message is successfully decoded by the mobile station, otherwise is decreased by 4. When the DSC indicates that the downlink signaling failure status is seriously interfered, such as the DSC is lower than a predefined value, the mobile station disables the smart monitoring procedure. In addition, the signal strength received from the broadcast control channel (BCCH) is referred to as Received Signal Level (RXLEX) which is a parameter for describing the quality of a channel measured in dBm. When the measured quality of the channel is worse than an acceptable level, such as the RXLEX is lower than a predefined value, the mobile station disables the smart monitoring procedure. Furthermore, the received signal to noise ratio $E_c/N_0$ (signal energy to noise power spectral density ratio) and received signal code power (RSCP) of primary synchronization code (PSC) in the Common Pilot Channel (CPICH) may be used to measure the quality of a channel. For example, when the RSCP is lower than −90 dBm or the received signal to noise ratio $E_c/N_0$ is lower than −15 dBM, the radio link quality is regarded as poor. When the measured channel quality is poor, the mobile station disables the smart monitoring procedure.

In an embodiment, the specific condition is determined according to a quantity of mobile stations camped on the cell. In general, when the quantity of the paged mobile stations is increased, the cell may not repeatedly send the same identity information for tolerating bad air interface. For example, when the mobile station detects a paging message and discovers two International Mobile Subscriber Identity (IMSI), three Temporary Mobile Subscriber Identity (TMSI), or one IMSI with one TMSI, or more, the mobile station disables the smart monitoring procedure. Furthermore, in an embodiment, the specific condition is determined according to a message type of the received message or an operational state of the mobile station. For example, when the received message is not a paging message, the mobile station disables the smart monitoring procedure. If the received message is a paging message, a paging type of the paging message is further detected. The mobile station disables the smart monitoring procedure when the received paging message is not a normal paging, such as an extended paging or a reorganization paging. On top of that, when the operational state of the mobile station indicates that a cell reselection procedure is being performed, the mobile station also disables the smart monitoring procedure.

Figure 8:
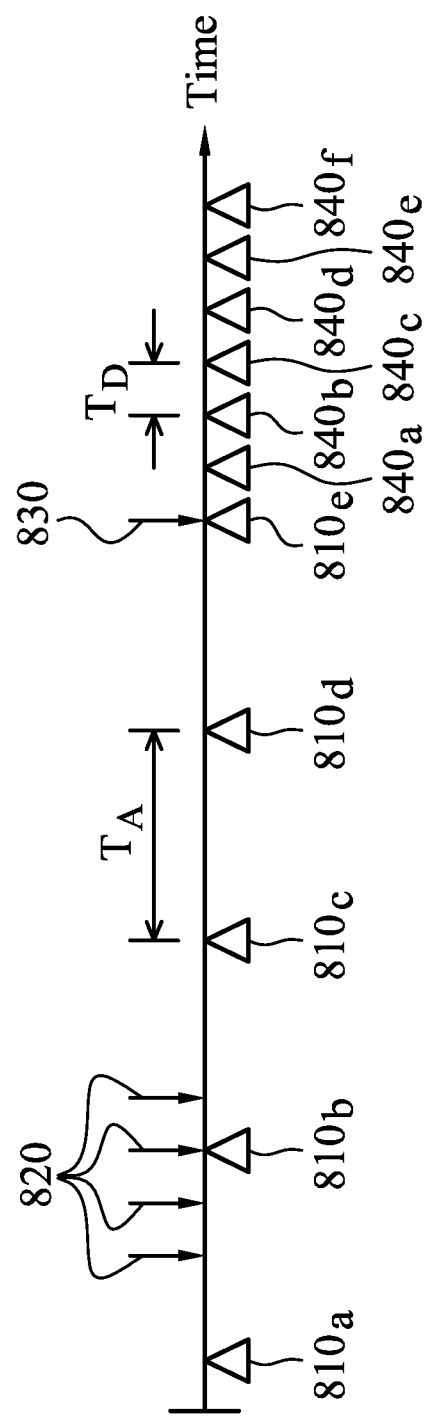

FIG. 8 shows a schematic diagram illustrating an exemplary distribution of paging occasions of the mobile station at which the mobile station listens to and paging messages broadcasted from the cell that the mobile station has camped on. First, the mobile station performs a smart monitoring procedure to monitor the PCH/S-CCPCH at every end of predetermined time interval $T_A$ subsequent to the last monitored time, causing broadcasted paging messages to be obtained at the paging occasions $810_a$, $810_b$, $810_c$, $810_d$ and $810_e$. For example, if the cell sends the paging message 820 four times to prevent message distortion, and the mobile station may receive the paging message 820 at paging occasion $810_e$. Thus, the mobile station does not miss the paging message. Next, at paging occasion $810_e$, the mobile station detects at least one of the above specific conditions. Thus, the mobile station stops performing the smart monitoring procedure and then monitors the PCH at every end of time interval $T_D$ subsequent to the last monitored time, such as the paging occasions $840_a$, $840_b$, $840_c$, $840_d$, $840_e$ and $840_f$, until a next smart monitoring procedure is performed.

Figure 9:
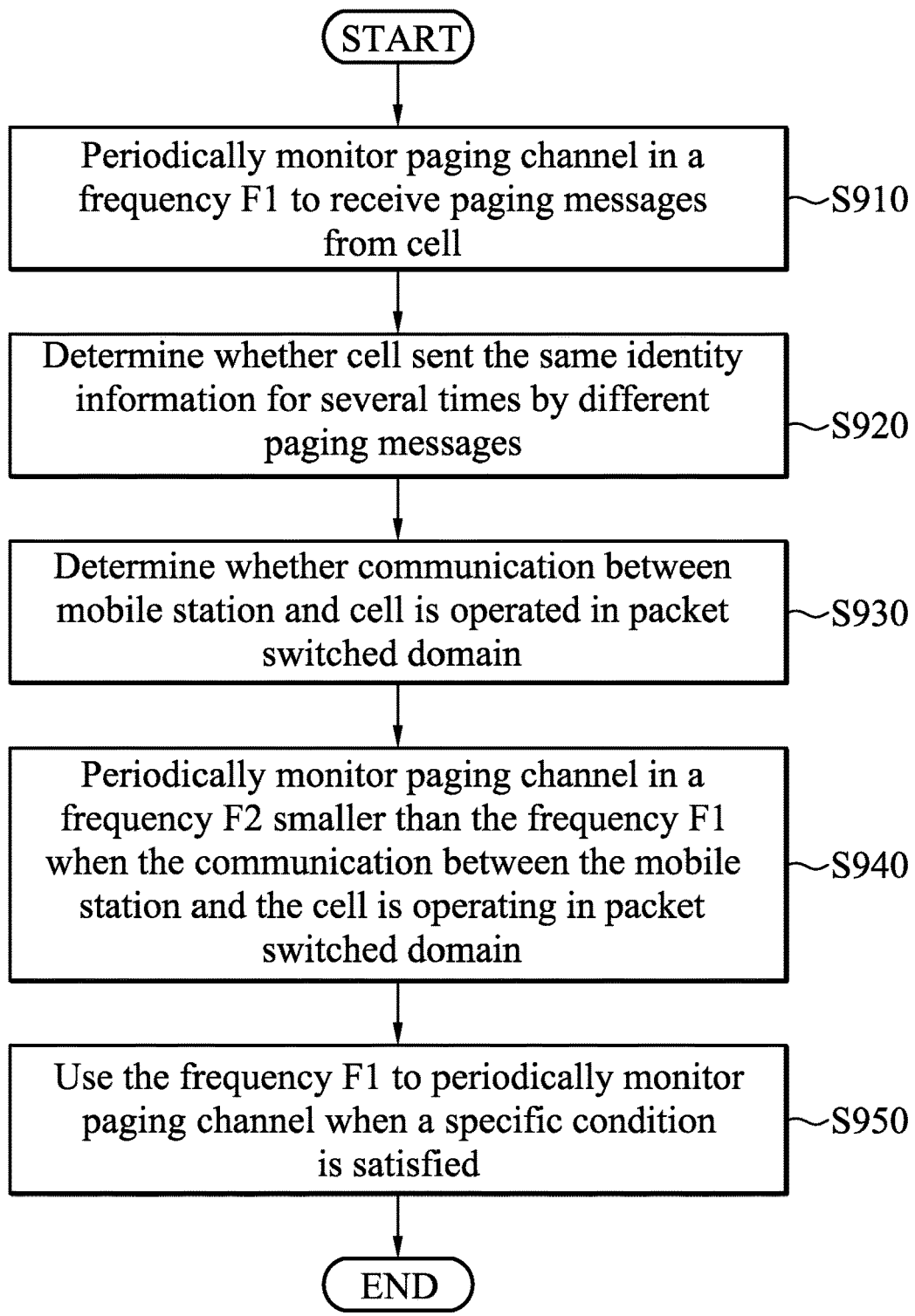
FIG. 9 shows a method for monitoring paging messages with reduced power consumption according to another embodiment of the invention.

FIG. 9 shows a method for monitoring paging messages with reduced power consumption according to an embodiment of the invention. The method is performed by a mobile station (e.g. 100 of FIGS. 1 and 2) with a subscriber identity card camping on a cell (e.g. 201 of FIG. 2). First, the mobile station periodically monitors a paging channel in a frequency F1 to receive paging messages from the cell (step S910), wherein the frequency F1 may be obtained according to the predetermined time interval $T_D$ of FIG. 6A (e.g. F1=1/$T_D$). Next, the mobile station determines whether the cell sent the same identity information for several times by different paging messages (step S920). Next, the mobile station determines whether communication between the mobile station and the cell is operating in a packet switched domain (step S930), that is, a PDP context has been successfully established. Next, the mobile station uses a frequency F2 lower than the frequency F1 to periodically monitor the paging channel when determining that the communication between the mobile station and the cell is operating in a packet switched domain (step S940). Thus, interruption for data packet transceiving is reduced, resulting in improved throughput. Similarly, the frequency F2 may be obtained according to the predetermined time interval $T_A$ of FIG. 6A (e.g. F2=1/$T_A$). The frequency F1 is a multiple of the frequency F2 as the time interval $T_A$ is a multiple of the predetermined time interval $T_D$. Next, the mobile station uses the frequency F1 to periodically monitor the paging channel when a specific condition is satisfied (step S950). As described above, the specific condition is determined according to an air interface condition between the mobile station and the cell, a quantity of mobile stations camped on the cell, a message type of the received message or an operational state of the mobile station.

Figure 10:
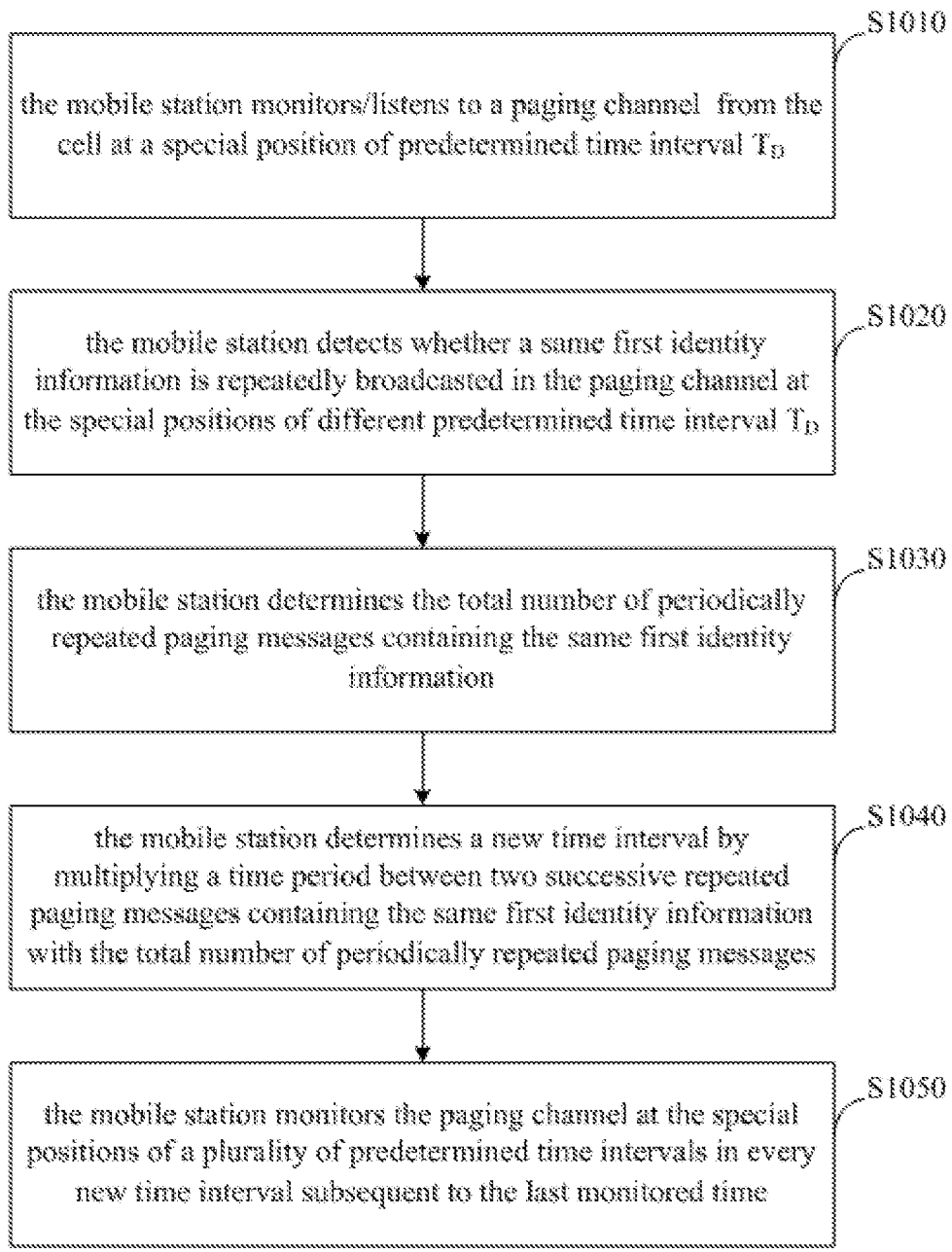
FIG. 10 shows a method for monitoring paging messages with reduced power consumption according to an embodiment of the invention.

FIG. 10 shows a method for monitoring paging messages with reduced power consumption according to an embodiment of the invention. The method is performed by a mobile station (e.g. 100 of FIGS. 1 and 2) with a subscriber identity card camping on a cell (e.g. 201 of FIG. 2). First, the mobile station monitors/listens to a paging channel (e.g. S-CCPCH) from the cell at special position of every predetermined time interval $T_D$ subsequent to the last monitored time (step S1010) to obtain the carried paging messages, for example, at the end of every predetermined time interval $T_D$, wherein the mobile station receives the paging message via a radio transceiver module thereof (e.g. 104 of FIG. 1). Next, the mobile station detects whether a same first identity information is repeatedly broadcasted in the paging channel at the special positions of different predetermined time interval $T_D$ (step S1020), wherein the same first identity information is corresponded to another mobile station, and the mobile station performs the detection via a baseband processing module of the mobile station (e.g. 103 of FIG. 1). It is to be understood that delivering of a paging message through the paging channels more than one time can diminish the possibility of MT call lost. Next, the mobile station determines the total number of periodically repeated paging messages containing the same first identity information (step S1030), wherein the mobile station performs the determination via a baseband processing module of the mobile station (e.g. 103 of FIG. 1). Next, the mobile station determines a new time interval by multiplying a time period between two successive repeated paging messages containing the same first identity information with the total number of periodically repeated paging messages (step S1040), wherein the new time interval comprises a monitoring interval equaling to the length of the time period and a sleep interval equaling to a multiple of the length of the time period between two successive repeated paging messages, and the multiple equals to the total number minus one; wherein the monitoring interval comprises a plurality of predetermined time intervals. The mobile station performs the determination via a baseband processing module of the mobile station (e.g. 103 of FIG. 1). Next, the mobile station monitors the paging channel at the special positions of the plurality of predetermined time intervals in every new time interval subsequent to the last monitored time so as to receive subsequent paging messages from the cell (step S1050), wherein the mobile station receives the paging message via a radio transceiver module thereof (e.g. 104 of FIG. 1). In step S1030, the time period between two successive repeated paging messages containing the same first identity information is N times the length of the predetermined time interval. That is, the same first identity information is repeated every N predetermined time interval, and the plurality of predetermined time intervals in the monitoring interval are N continuous predetermined time intervals. For example, the length of the predetermined time interval is $T_D$, and the length of the time period between two successive repeated paging messages is $N*T_D$, and the length of the plurality of predetermined time intervals in the monitoring interval is $N*T_D$.

In one embodiment, in the step S1030, the mobile station determines the total number of periodically repeated paging messages monitored at different predetermined time interval, wherein periodically repeated paging messages contain the same first identity information. Furthermore, in the step S1040, the mobile station determines the new time interval by multiplying a time period between two successive repeated paging messages containing the same first identity information with the determined total number in the step S1030, wherein the two successive repeated paging messages belong to different predetermined time interval. For example, the mobile station A monitors a first paging message and a second paging message at a first predetermined time interval, and monitors a third paging message at a second predetermined time interval. Although the mobile station A detects three paging messages, the mobile station A determines the total number of periodically repeated paging messages monitored at the first and second predetermined time interval is two, rather than three.

Figure 11:
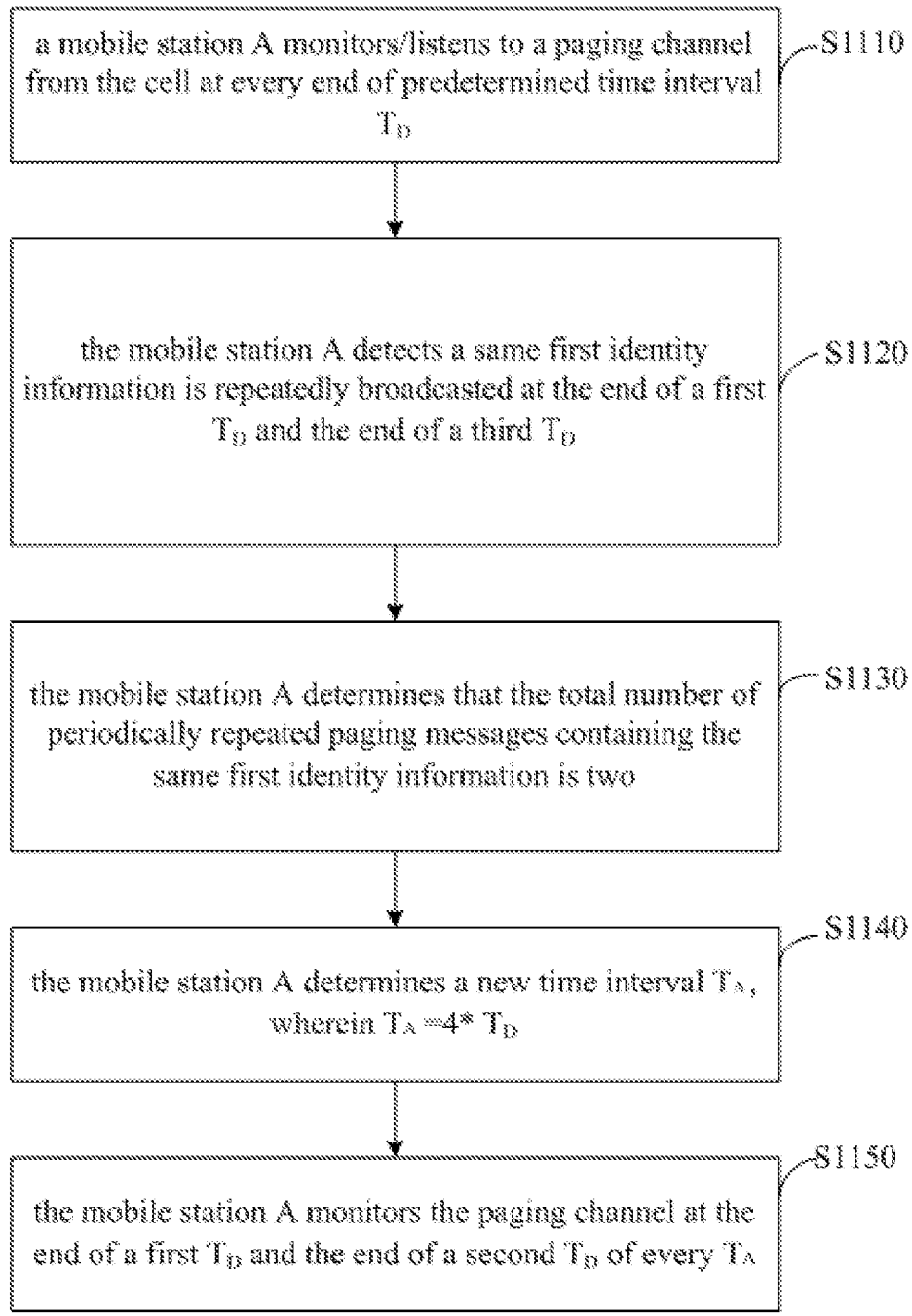
FIG. 11 shows a detailed method for monitoring paging messages with reduced power consumption according to another embodiment of the invention.

FIG. 11 shows a detailed method for monitoring paging messages with reduced power consumption according to another embodiment of the invention. First, a mobile station A monitors/listens to a paging channel (e.g. S-CCPCH) from the cell at every end of predetermined time interval TD subsequent to the last monitored time (step S1110) to obtain the carried paging messages. Next, the mobile station A detects a same first identity information is repeatedly broadcasted in the paging channel at a first predetermined time interval $T_D$ and a third predetermined time interval $T_D$ (step S1120), wherein the first identity information is corresponded to mobile station B. That is, the mobile station A detects the same first identity information every N predetermined time interval $T_D$, wherein N is two. Next, the mobile station A determines that the total number of periodically repeated paging messages containing the same first identity information is two (step S1130). Next, the mobile station A determines a new time interval $T_A$ (step S1140), wherein $T_A=4*T_D$. Next, the mobile station A monitors the paging channel at the end of a first $T_D$ and the end of a second $T_D$ of every $T_A$ and the station A goes to sleep in the third $T_D$ and the fourth $T_D$ (step S1150).

It is noted that the mobile station can obtain a paging pattern of the cell in step S1120, i.e. the cell can repeatedly send a paging message every two time interval $T_D$, then the mobile station determines the new time interval $T_A=4*T_D$ and performs a smart monitoring procedure. So, in this embodiment, if only the mobile station can obtain a paging pattern of the cell according to the same first identity information is repeatedly broadcasted at a first predetermined time interval $T_D$ and a third predetermined time interval $T_D$, the mobile station may determine the new time interval and perform a smart monitoring procedure regardless of whether to detect a paging message containing a second identity information at a second predetermined time interval $T_D$.

Figure 12:
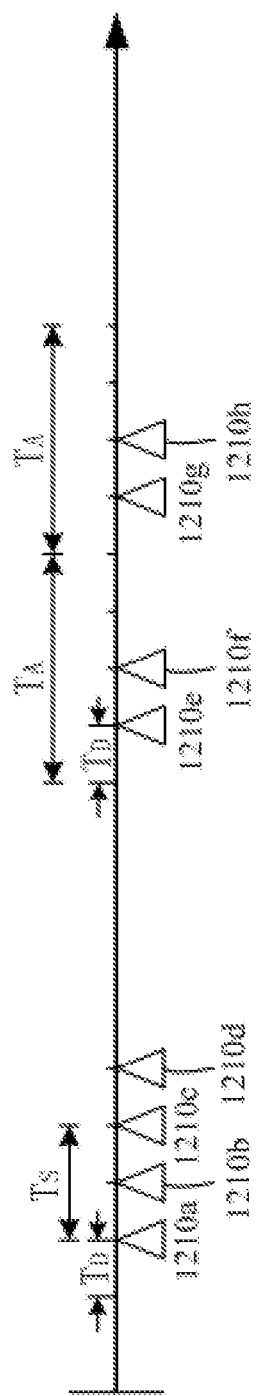

In another embodiment, as shown in FIG. 12, the same first identity information corresponding to a mobile station B is carried by the paging messages at paging occasions 1210a and 1210c, the same second identity information corresponding to a mobile station C is carried by the paging messages at paging occasions 1210b and 1210d. The obtained time period Ts is $2*T_D$ and the total number of redundant paging messages containing the same first identity information or the same second identity information is two. Next, the mobile station performs a smart monitoring procedure to reduce times for monitoring/listening to the paging channel or stay in the sleep mode at the sleep interval to save battery power consumption. That is, the mobile station monitors the paging channel at a first $T_D$ and a second $T_D$ of every $T_A$, for example, at paging occasions 1210e, 1210f, 1210g and 1210h, and goes to sleep at a third $T_D$ and a fourth $T_D$ of every $T_A$.

Figure 13:
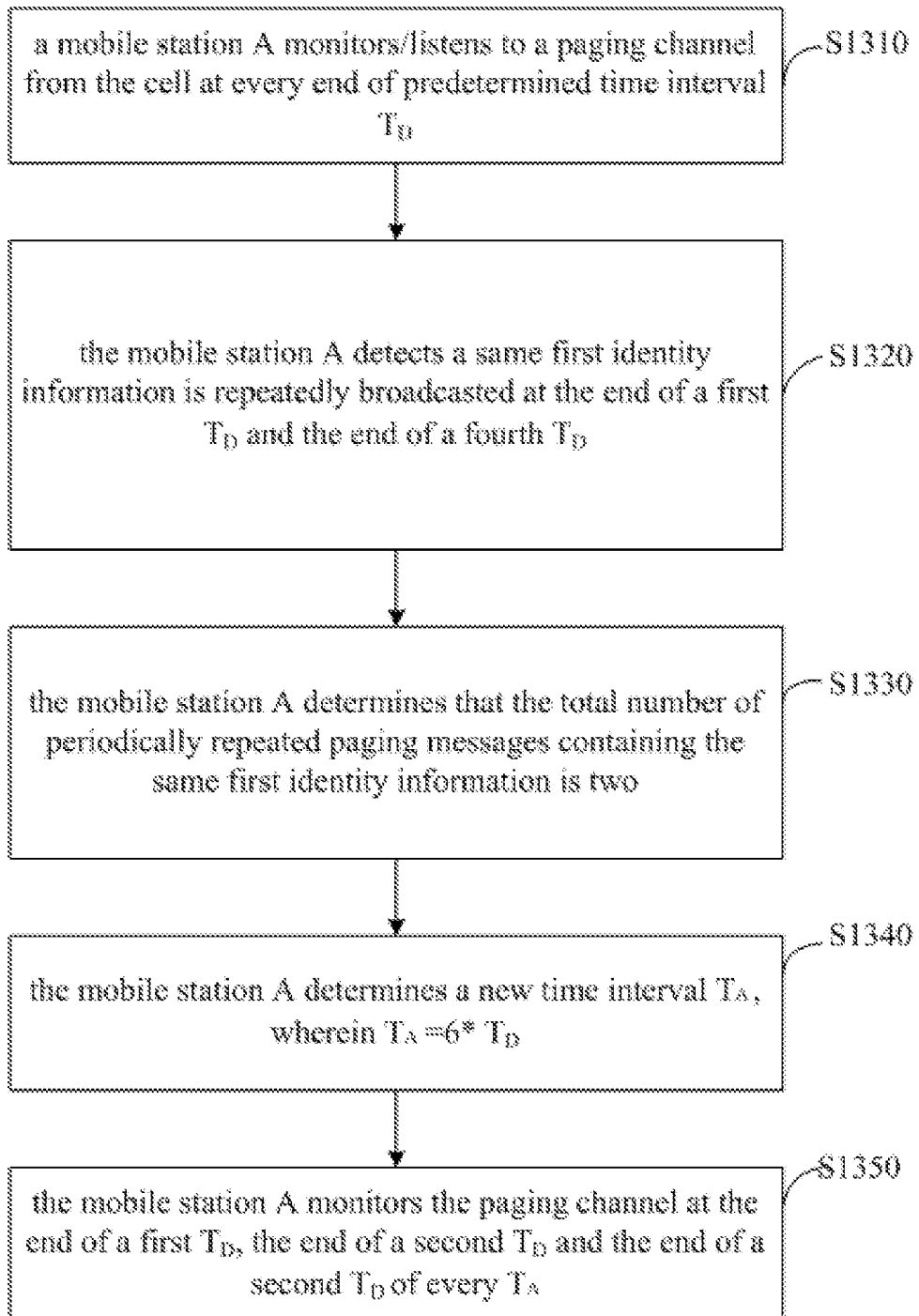
FIG. 13 shows another detailed method for monitoring paging messages with reduced power consumption according to another embodiment of the invention.

FIG. 13 shows a detailed method for monitoring paging messages with reduced power consumption according to another embodiment of the invention. First, a mobile station A monitors/listens to a paging channel (e.g. S-CCPCH) from the cell at every end of predetermined time interval $T_D$ subsequent to the last monitored time (step S1310) to obtain the carried paging messages. Next, the mobile station A detects a same first identity information is repeatedly broadcasted in the paging channel at the end of a first predetermined time interval $T_D$ and the end of a fourth predetermined time interval $T_D$, wherein the first identity information is corresponded to mobile station B (step S1320). That is, the same first identity information is repeated every N predetermined time interval $T_D$, wherein N is three. Next, the mobile station A determines that the total number of periodically repeated paging messages containing the same first identity information is two. Next, the mobile station A determines a new time interval $T_A$, wherein $T_A=6*T_D$ (step S1340) Next, the mobile station A monitors the paging channel at the end of a first $T_D$, the end of a second $T_D$ and the end of a third $T_D$ of every $T_A$ (step S1350).

In this embodiment, it is noted that the mobile station can obtain a paging pattern of the cell in step S1320, i.e. the cell can repeatedly send a paging message every third time interval $T_D$, then the mobile station determines the new time interval $T_A=6*T_D$ and performs a smart monitoring procedure. So, in this embodiment, if only the mobile station can obtain a paging pattern of the cell in step S1320, the mobile station may determine the new interval and performs the smart monitoring procedure regardless of whether to detect a paging message containing a second identity information at a second predetermined time interval $T_D$.

Figure 14:
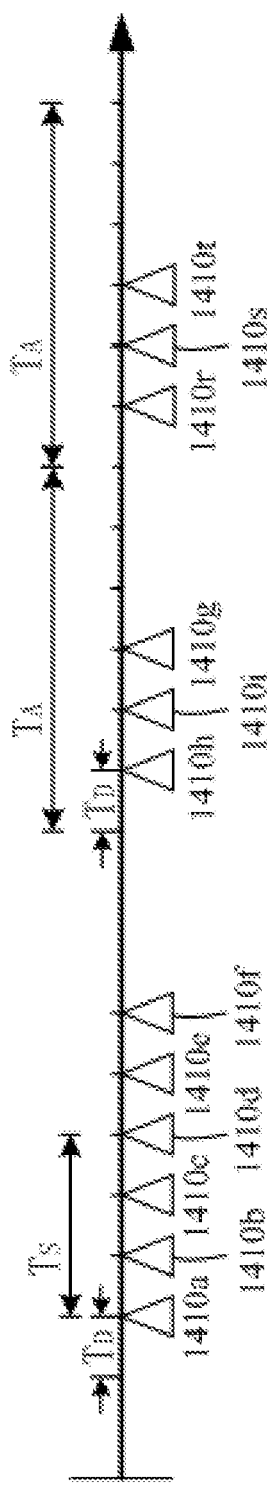

In another embodiment, as shown in FIG. 14, before activating the smart monitoring procedure, the mobile station may obtains the first identity information corresponding to the mobile station B at paging occasions 1410a and 1410d, and obtains a second identity information corresponding to a mobile station C at paging occasions 1410b and 1410e, and obtains a third identity information corresponding to a mobile station D at paging occasions 1410c and 1410f, and recognizes a time period between two successive same paging messages is Ts=3*$T_D$. Thereafter, the mobile station performs a smart monitoring procedure. Specially, the mobile station monitors the PCH/S-CCPCH at a first $T_D$, a second $T_D$ and a third $T_D$ of every $T_A$, for example, at paging occasions 1410h, 1410i, 1410g, and 1410r, 1410s, 1410t.

Although the invention has been described by way of detecting a repeated paging message every two predetermined time interval or every third predetermined time interval, it is to be understood that the invention is not limited thereto.

The mobile station A can check the paging pattern of the cell. In an embodiment, the mobile station A can continue to monitor the paging channel for a long duration before performing a smart procedure, for example, 1 second. Then, the mobile station checks whether a time period between two successive repeated paging messages containing a same identity information during the long duration equals to the time period between two successive repeated paging messages containing the first same identity information in step S1040, and if the checked result is yes, the mobile station performs determining the new time interval and the smart monitoring procedure. If the checked result is no, the paging pattern of the cell obtained in the manner described above is not correct, so the mobile station continues to monitor the paging channel in a conventional method.

In an alternative embodiment, the mobile station A can continue to monitor the paging channel for a predetermined number of paging messages, for example, 10 paging messages. Then, the mobile station checks whether a time period between two successive repeated paging messages containing a same identity information in 10 paging messages equals to the time period in step S1040, and if the checked result is yes, the mobile station performs following smart monitoring procedure. If the checked result is no, the paging pattern of the cell obtained in the manner described above is not correct, so the mobile station continues to monitor the paging channel in a conventional method.

In another embodiment, before activating the smart monitoring procedure, the mobile station may detects(or obtains) the first identity information corresponding to the mobile station B every two $T_D$, and determines the first total number of periodically repeated paging messages containing the same first identity information is two. Furthermore, the mobile station detects the second identity information corresponding to the mobile station C every two $T_D$, and determines the second total number of periodically repeated paging messages containing the same second identity information is three. The mobile station determines a new time interval based on a minimum of the first total number of periodically repeated paging messages and the second total number of periodically repeated paging messages. That is, the mobile station determines a new time interval by multiplying a time interval between two successive paging messages containing the same identity information, i.e. two $T_D$, with the minimum, i.e. two. So, the new time interval $T_A$ is 4*$T_D$. In a summary, if the plurality of mobile station (e.g. the mobile station B and the mobile station C) have a same paging cycle (e.g. two $T_D$), and a plurality of total number of periodically repeated paging messages corresponding to the plurality of mobile station are different, the new interval is obtained based on a minimum of the plurality of total number of periodically repeated paging messages.

In another embodiment, before activating the smart monitoring procedure, the mobile station detects the first identity information corresponding to the mobile station B every two $T_D$, and detects the second identity information corresponding to the mobile station C every third $T_D$. That is, the mobile station B and the mobile station C have different paging cycle. In such circumstances, the cell has not a fixed paging pattern, so the smart monitoring procedure does not be initiated.

Figure 15:
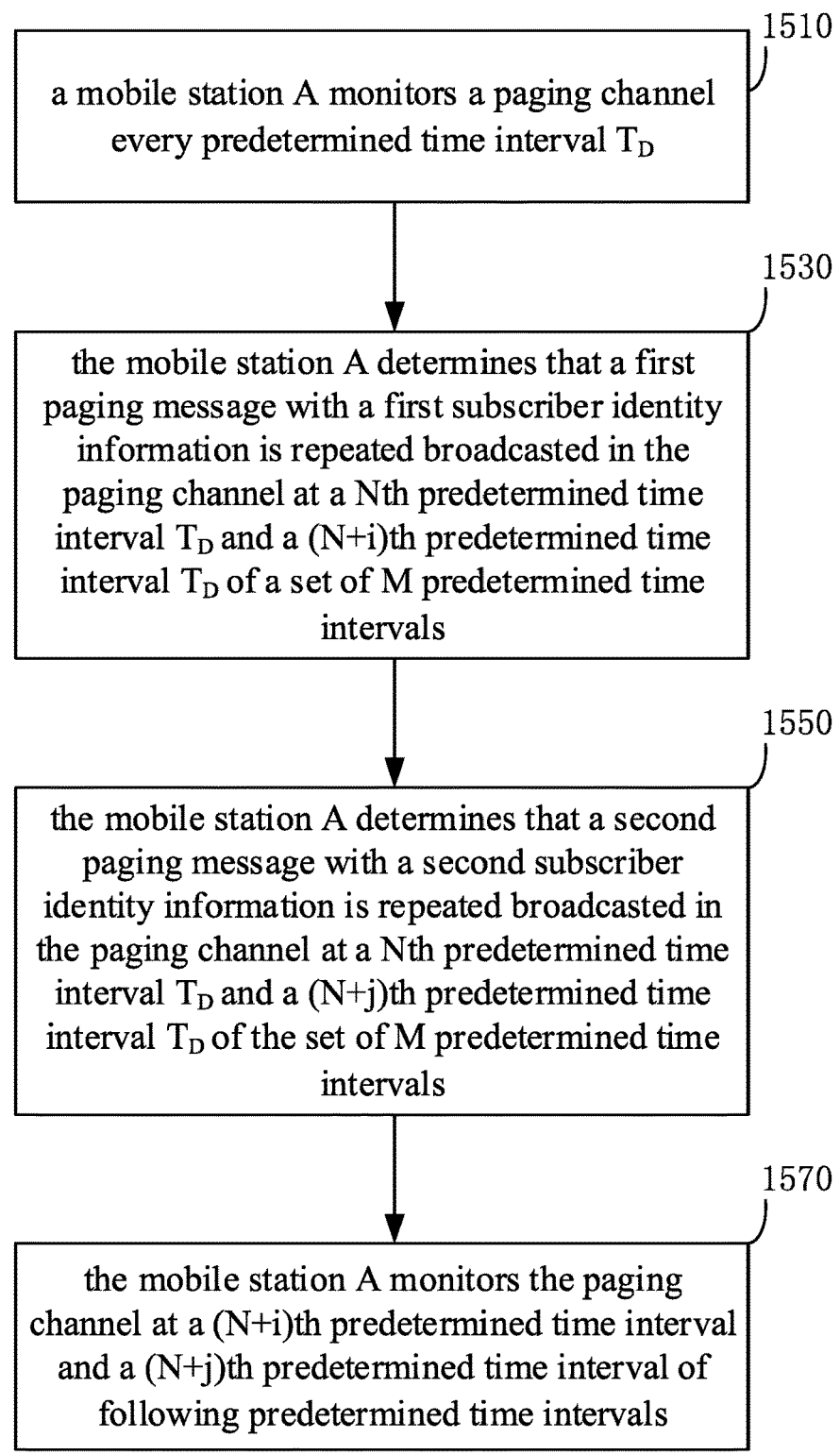
FIG. 15 shows another detailed method for monitoring paging messages with reduced power consumption according to another embodiment of the invention.

FIG. 15 shows a detailed method for monitoring paging messages with reduced power consumption according to another embodiment of the invention. First, a mobile station A monitors/listens to a paging channel(e.g. S-CCPCH) from the cell every predetermined time interval $T_D$ subsequent to the last monitored time (step S1510). Next, the mobile station A determines that a first paging message with a first subscriber identity information is repeatedly broadcasted in the paging channel at a Nth predetermined time interval $T_D$ and a (N+i)th predetermined time interval $T_D$ of a set of M predetermined time intervals (step S1530). Specially, in one condition, a mobile station with the first subscriber identity does not receive the first paging message at the Nth predetermined time interval $T_D$, so the cell of network will retransmit the first paging message at the (N+i)th predetermined time interval $T_D$. In another condition, the mobile station with the first subscriber identity does not transmit a response to the first paging message after receiving the first paging message at the Nth predetermined time interval $T_D$, so the cell of network will retransmit the first paging message at the (N+i)th predetermined time interval $T_D$. Next, the mobile station A determines that a second paging message with a second subscriber identity information is repeated broadcasted in the paging channel at a Nth predetermined time interval $T_D$ and a (N+j)th predetermined time interval $T_D$ of the set of M predetermined time intervals (step S1550). Similar to the description of the step S1530, a mobile station with the second subscriber identity does not receive the second paging message at the Nth predetermined time interval $T_D$, or the mobile station with the second subscriber identity does not transmit a response to the second paging message after receiving the second paging message at the Nth predetermined time interval $T_D$, so the cell of network will retransmit the second paging message at the (N+j)th predetermined time interval $T_D$. In one embodiment, the first subscriber identity information is the same as the second subscriber identity information, and the first paging message is the same as the second paging message. In another embodiment, the first subscriber identity information is different from the second subscriber identity information, and the first paging message is different from the second paging message.

The mobile station can obtain a paging rule of the cell of the network based on the monitored result in the step S1530 and the step S1550. For a same mobile station, the cell of the network transmits a paging message for the same mobile station at the Nth predetermined time interval $T_D$ or the (N+i)th predetermined time interval $T_D$, or the cell of the network transmits a paging message for the same mobile station at the Nth predetermined time interval $T_D$ or the (N+j)th predetermined time interval $T_D$. That is, if the cell of the network transmits the paging message at the Nth predetermined time interval $T_D$ and does not receive a response to the paging message, so the cell of the network must retransmit the paging message at the (N+i)th predetermined time interval $T_D$ or/and the (N+j)th predetermined time interval $T_D$. So, if the mobile station monitors the paging channel at a (N+i)th predetermined time interval and a (N+j)th predetermined time interval, rather than monitors the paging channel at a Nth predetermined time interval, the mobile station must receive the paging message. So, in the step S1570, the mobile station A monitors the paging channel at a (N+i)th predetermined time interval and a (N+j)th predetermined time interval of following predetermined time intervals, wherein the following predetermined time intervals are subsequent to the set of M predetermined time intervals (step S1570), wherein N may be any positive integer, and station A monitors the paging channel at a predetermined time interval comprises station A monitors the paging channel at the end of the predetermined time interval.

In summary, the mobile station can obtain a paging rule of the cell of the network based on the monitored result, thus the mobile station only monitors the paging channel at the (N+i)th predetermined time interval and the (N+j)th predetermined time interval of following predetermined time intervals, rather than the paging channel at the Nth, the (N+i)th and the (N+j)th predetermined time interval. With this arrangement, the monitoring time for monitoring the paging channel is reduced and it can ensure the paging message is not missed.

In one embodiment, as illustrated in FIG. 16, a mobile station A monitors/listens to a paging channel at eight predetermined time intervals $T_{D1}$-$T_{D8}$. Then, the mobile station A determines a paging messsage for a mobile station B is repeatedly broadcasted in a first predetermined time interval $T_{D1}$ and a third predetermined time interval $T_{D3}$, wherein the paging messsage for the mobile station B has a subscriber identity information of the mobile station B. And the mobile station A further determines a paging messsage for a mobile station C is repeatedly broadcasted in the first predetermined time interval $T_{D1}$ and a fifth predetermined time interval $T_{D5}$, wherein the paging messsage for the mobile station C has a subscriber identity information of the mobile station C. Thus, the mobile station A monitors the paging channel in the $T_{D3}$ and the $T_{D5}$ in the following monitor prosecution. With this arrangement, the mobile station A can have a smaller monitoring time and it can ensure the paging message is not missed.

Figure 17B:
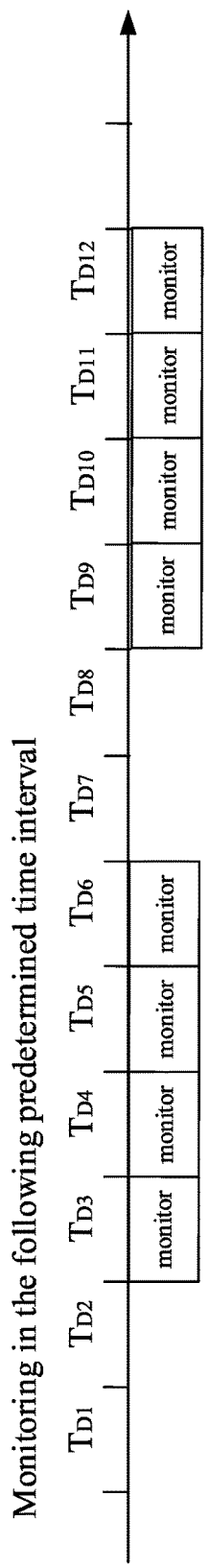

Please referring to FIG. 17A, the present application provides another embodiment. The difference between FIG. 17A and FIG. 16 is the mobile station A also determines that a paging messsage is received in a portion of even-numbered predetermined interval $T_D$. The mobile station A determines that a paging messsage for a mobile station E is repeated broadcasted in a second predetermined time interval $T_{D2}$ and a fourth predetermined time interval $T_{D4}$, wherein the paging messsage for the mobile station E has a subscriber identity information of the mobile station E. And the mobile station A further determines that a paging messsage for a mobile station F is repeatedly broadcasted in the second predetermined time interval $T_{D2}$ and a sixth predetermined time interval $T_{D6}$, wherein the paging messsage for the mobile station F has a subscriber identity information of the mobile station F. After studying the paging rule of the cell of the network, the mobile station A monitors the paging channel in the third predetermined interval $T_{D3}$, the fourth predetermined interval $T_{D4}$, the fifth predetermined interval $T_{D5}$ and a sixth predetermined interval $T_{D6}$ in the following monitor prosecution. Please referring to FIG. 17B, the present application provides another embodiment. The difference between FIG. 17A and FIG. 17B is the mobile station A monitors the paging channel in $T_{D3}$, $T_{D4}$, $T_{D5}$, $T_{D6}$, $T_{D9}$, $T_{D10}$, $T_{D11}$, and $T_{D12}$ in the following monitor prosecution. In this embodiment, the mobile station A can detect the paging message being repeatedly broadcasted in $T_{D7}$ and $T_{D9}$, or $T_{D7}$ and $T_{D11}$, or $T_{D8}$ and $T_{D10}$, or $T_{D8}$ and $T_{D12}$ in previous study process, or the mobile station A does not need to monitor the paging message in $T_{D7}$ and $T_{D9}$, or $T_{D7}$ and $T_{D11}$, or $T_{D8}$ and $T_{D10}$, or $T_{D8}$ and $T_{D12}$ in previous study process and the mobile station A performs following monitor based on the study for predetermined intervals from $T_{D1}$ and $T_{D6}$.

Figure 18:
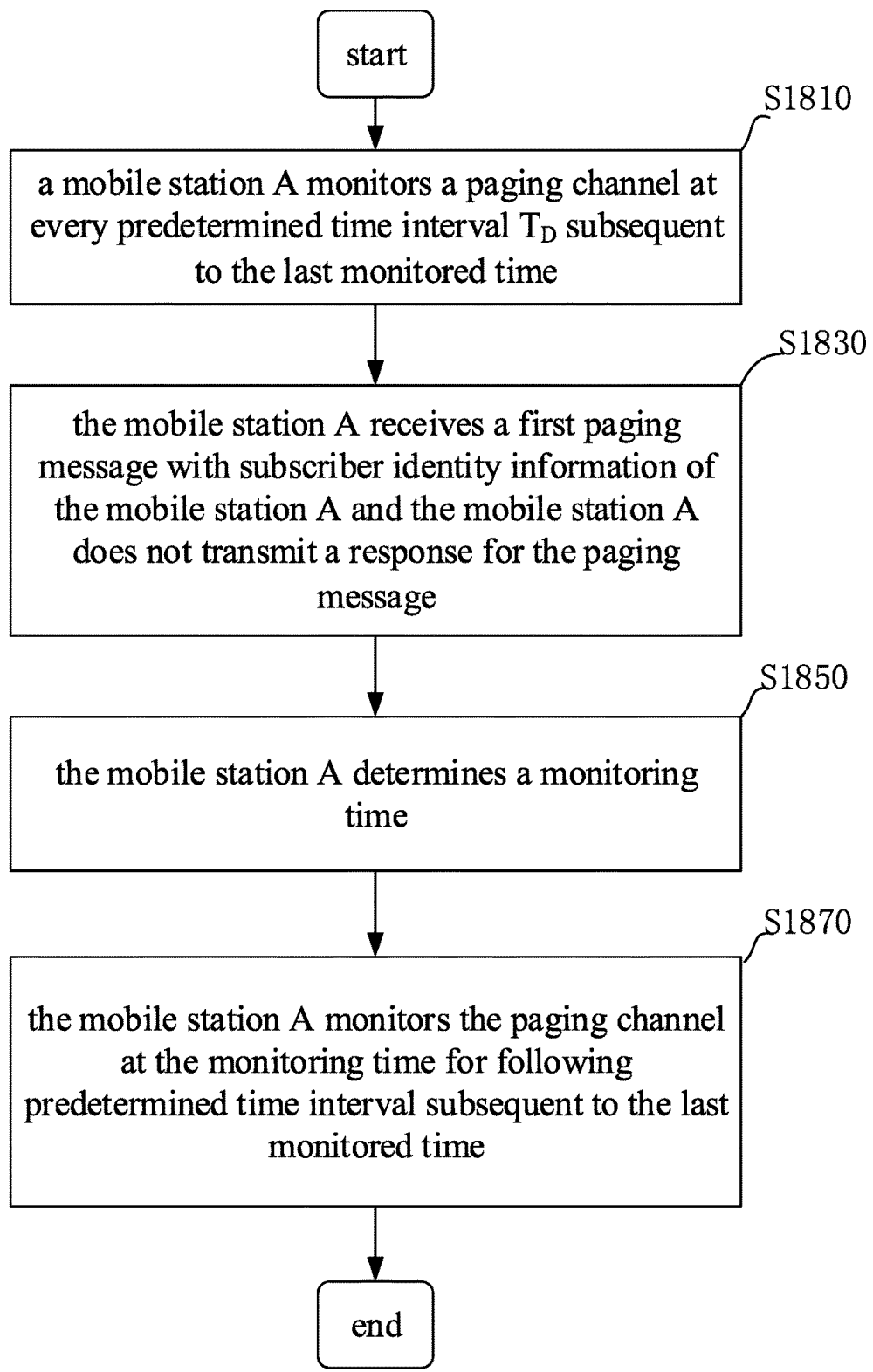
FIG. 18 shows detailed methods for monitoring paging messages with reduced power consumption according to embodiments of the invention.

FIG. 18 shows a detailed method for monitoring paging messages with reduced power consumption according to another embodiment of the invention. First, a mobile station A monitors/listens to a paging channel (e.g. S-CCPCH) from the cell at every predetermined time interval $T_D$ subsequent to the last monitored time (step S1810). Next, the mobile station A receives a first paging message with subscriber identity information of the mobile station A and the mobile station A does not transmit a response for the paging message when the mobile station receives the paging message (step S1830). Next, the mobile station A determines a monitoring time based on the number of successively broadcasted paging message and predetermined time intervals at which the paging message is received (step S1850). Next, the mobile station A monitors the paging channel at the monitoring time for following predetermined time interval subsequent to the last monitored time (step S1870).

It should be understood that if the mobile station A transmits a response for a paging message when the mobile station A receives the paging message, the cell does not send the paging message again after receiving the response. Thus, the mobile station can't study a paging rule of the cell correctly. In this embodiment, the mobile station A does not transmit a response for the paging message when the mobile station A receives the paging message so that the mobile station A can correctly study a paging rule of the cell.

Figure 19:
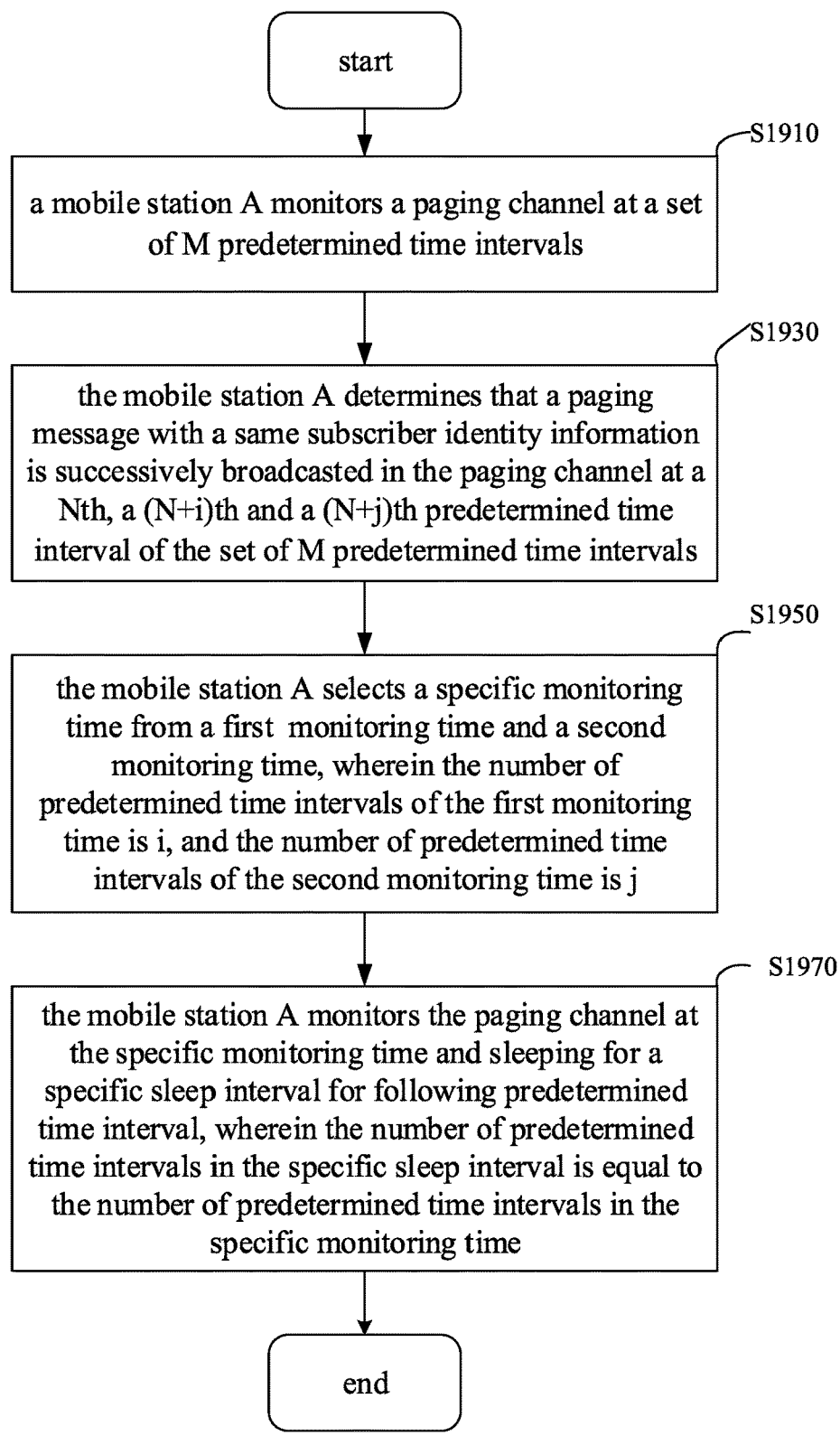
FIG. 19 shows detailed methods for monitoring paging messages with reduced power consumption according to embodiments of the invention.

FIG. 19 shows a detailed method for monitoring paging messages with reduced power consumption according to another embodiment of the invention. First, a mobile station A monitors/listens to a paging channel (e.g. S-CCPCH) from the cell at a set of M predetermined time intervals (step S1910). Next, the mobile station A determines that a paging message with a same subscriber identity information is successively broadcasted in the paging channel at a Nth predetermined time interval, a (N+i)th predetermined time interval and (N+j)th predetermined time interval of the set of M predetermined time intervals (step S1930). Next, the mobile station A selects a specific monitoring time from a first monitoring time and a second monitoring time, wherein the number of predetermined time intervals of the first monitoring time is i, and the number of predetermined time intervals of the second monitoring time is j. (step S1950). Next, the mobile station A monitors the paging channel at the specific monitoring time and sleeping for a specific sleep interval for following predetermined time interval subsequent to the M predetermined time intervals, wherein the number of predetermined time intervals in the specific sleep interval is equal to the number of predetermined time intervals in the specific monitoring time (step S1970).That is, the mobile station can select an available monitoring time from a plurality of monitoring time (e.g. the first monitoring time and the second monitoring time) based on a predetermined rule, for example, network condition or a response speed for the paging message.

In one embodiment, as illustrated in FIG. 20, a mobile station A monitors/listens to a paging channel at eight predetermined time interval $T_D$. The mobile station A monitors a first paging message with a first subscriber identity information is repeatedly broadcasted in a first, a third, and a fifth predetermined time interval (i.e. $T_{D1}$, $T_{D3}$, $T_{D5}$) The mobile station A determines the first paging message with the first subscriber identity information B is received every 2 predetermined time intervals, and determines a first monitoring time is two predetermined time intervals and a second monitoring time is four predetermined time interval.

Furthermore, the mobile station A monitors that a second paging message with a second subscriber identity information C is repeatedly broadcasted in a second, a fourth and a sixth predetermined time interval (i.e. $T_{D2}$, $T_{D4}$, $T_{D6}$) The mobile station A determines that the second paging message with the second subscriber identity information is received every 2 predetermined time intervals, and can also determines a first monitoring time is two predetermined time intervals and a second monitoring time is four predetermined time interval. Next, the mobile station A selects the first monitoring time and monitors the paging channel in the $T_{D3}$, $T_{D4}$, $T_{D7}$ and $T_{D8}$. That is, the mobile station sleeps for two predetermined time intervals firstly, and then monitors the paging channel at $T_{D3}$ and $T_{D4}$, and then the mobile station sleeps for two predetermined time intervals again, and then monitors the paging channel at $T_{D7}$ and $T_{D8}$. With this arrangement, the mobile station A can make a response quickly no matter the cell transmits the paging message in any predetermined interval.

Please referring to FIG. 21, the present application provides another embodiment. The difference between FIG. 19 and FIG. 21 is that the mobile station selects the second monitoring time. So, the mobile station A monitors the paging channel in the $T_{D3}$, $T_{D4}$, $T_{D5}$ and $T_{D6}$ and $T_{D9}$, $T_{D10}$, $T_{D11}$ and $T_{D12}$ (not shown in FIG. 21). In this embodiment, the mobile station monitors the paging channel at a continuous 4 predetermined time intervals in the following L predetermined time intervals subsequent to last monitored time interval.

Please referring to FIG. 22, a mobile station A monitors/listens to a paging channel at eight predetermined time interval $T_D$. The mobile station A monitors a first paging message with a first subscriber identity information is repeatly broadcasted in a first, a third, and a sixth predetermined time interval (i.e. $T_{D1}$, $T_{D3}$, $T_{D6}$) The mobile station determines that a first monitoring time is two predetermined time intervals and a second monitoring time is five predetermined time intervals. Next, the mobile station A selects the second monitoring time, and monitors the paging channel in the $T_{D6}$, $T_{D7}$, $T_{D8}$, $T_{D9}$ and $T_{D10}$. That is, the mobile station sleeps for five predetermined time intervals firstly, and then monitors the paging channel at $T_{D6}$, $T_{D7}$, $T_{D8}$, $T_{D9}$ and $T_{D10}$, and then the mobile station sleeps for five predetermined time intervals again, and then monitors the paging channel at $T_{D16}$, $T_{D17}$, $T_{D18}$, $T_{D19}$ and $T_{D20}$.

Figure 23:
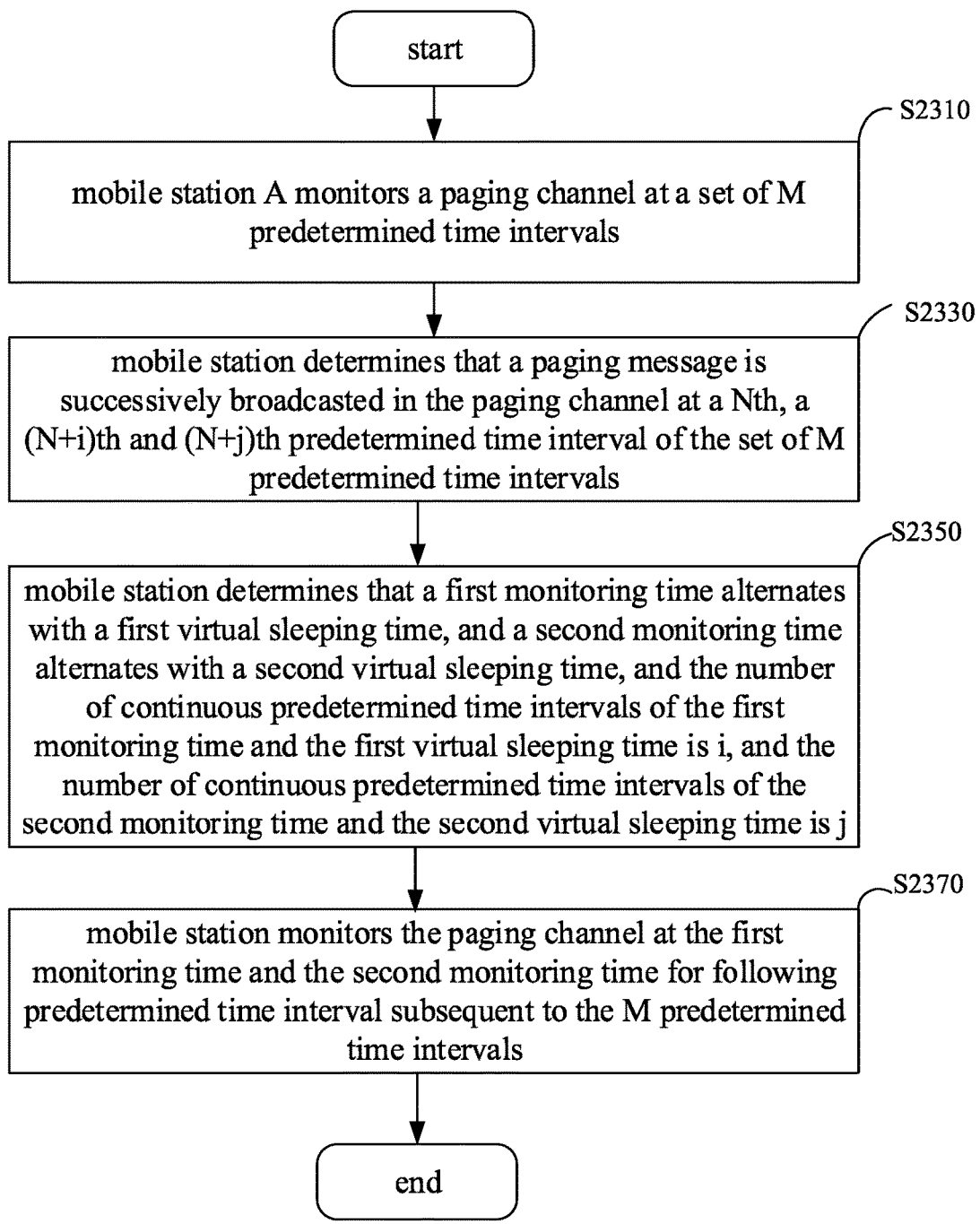
FIG. 23 shows another detailed method for monitoring paging messages with reduced power consumption according to another embodiment of the invention.

In a condition, if the network is under a poor condition so that the mobile station cannot receive the paging message in the first monitoring time or the second monitoring time. FIG. 23 shows a detailed method for monitoring paging messages for the condition. First, a mobile station A monitors/listens to a paging channel (e.g. S-CCPCH) from the cell at a set of M predetermined time intervals (step S2310). Next, the mobile station determines that a paging message with a same subscriber identity information is successively broadcasted in the paging channel at a Nth predetermined time interval, a (N+i)th predetermined time interval and (N+j)th predetermined time interval of the set of M predetermined time intervals(step S2330). Next, the mobile station determines that a first monitoring time alternates with a first virtual sleeping time, and a second monitoring time alternates with a second virtual sleeping time, and the number of predetermined time intervals of the first monitoring time and the first virtual sleeping time is i, and the number of predetermined time intervals of the second monitoring time and the second virtual sleeping time is j (step S2350), wherein the first virtual sleeping time and the second virtual sleeping time are virtual. Next, the mobile station monitors the paging channel at the first monitoring time and the second monitoring time for following predetermined time interval subsequent to the M predetermined time intervals (step S2370). That is, the mobile station monitors the paging channel at both the first monitoring time and the second monitoring time to ensure the receipt of the paging.

Figure 24:
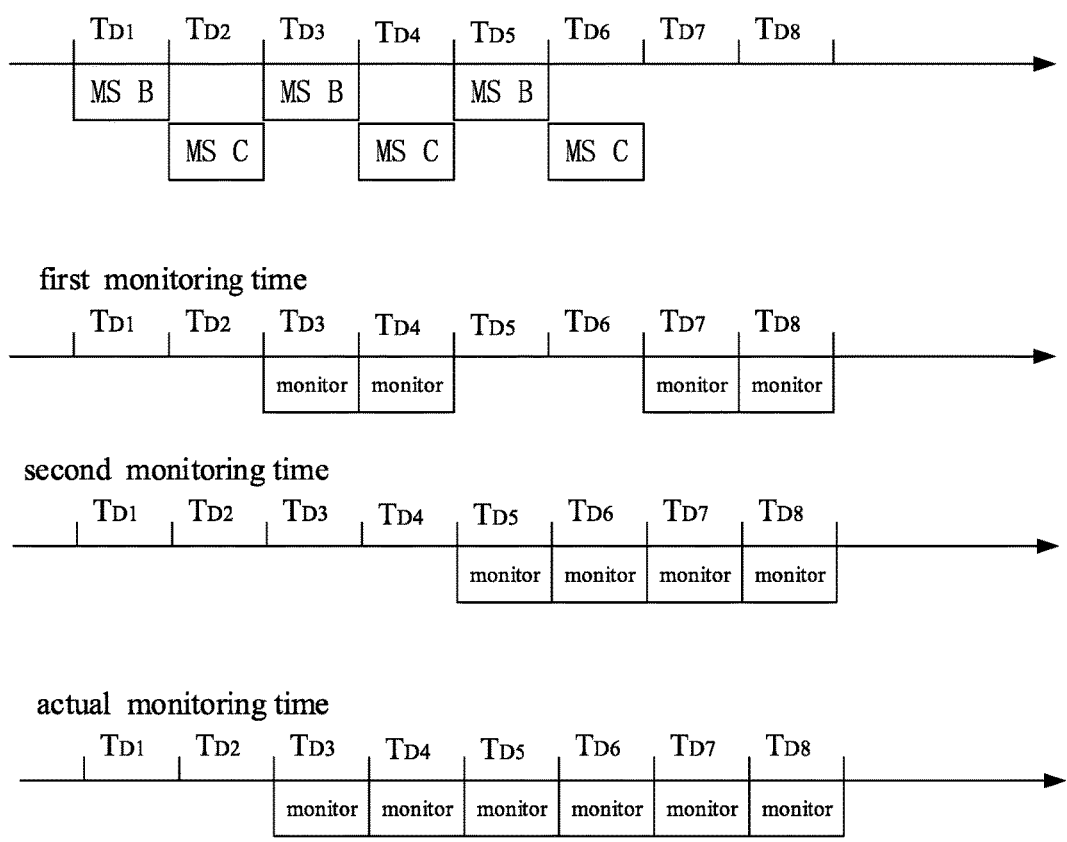

Please refer to FIG. 24, a mobile station A monitors/listens to a paging channel at eight predetermined time interval $T_D$. The mobile station A determines a first paging message with a first subscriber identity information is repeatedly broadcasted in a first, a third, and a fifth predetermined time interval (i.e. $T_{D1}$, $T_{D3}$, $T_{D5}$). The mobile station A determines that a first monitoring time is two continuous predetermined time intervals and a second monitoring time is four continuous predetermined time intervals. Next, the mobile station A monitors the paging channel in the first monitoring time and the second monitoring time, i.e. $T_{D3}$, $T_{D4}$, $T_{D5}$, $T_{D6}$, $T_{D7}$ and $T_{D8}$. With this arrangement, the mobile station A can monitor at a longer time to ensure the paging message is received.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for monitoring paging messages in a mobile station, comprising:

monitoring a paging channel at a set of M predetermined time intervals;

determining a first paging message with a first subscriber identity information being successively broadcasted in the paging channel at a Nth predetermined time interval and a (N+i)th predetermined time interval of the set of M predetermined time intervals;

determining a second paging message with a second subscriber identity information being successively broadcasted in the paging channel at the Nth predetermined time interval and a (N+j)th predetermined time interval of the set of M predetermined time intervals, wherein j>i;

monitoring the paging channel at a (N+i)th predetermined time interval and a (N+j)th predetermined time interval of following predetermined time intervals subsequent to the M predetermined time intervals.

2. The method of claim 1, wherein j=2i.

3. The method of claim 1, wherein the first subscriber identity information is different from the second subscriber identity information, or the first subscriber identity information is the same as the second subscriber identity information.

4. The method of claim 1, wherein the first subscriber identity information or the second subscriber identity information is subscriber identity information of the mobile station, and the mobile station does not transmit a response for the first paging message or the second paging message when the mobile station receives the first paging message or the second paging message.

5. The method of claim 2, further comprising:
determining a third paging message with a third subscriber identity information being successively broadcasted in the paging channel at a (N+L)th predetermined time interval and a (N+L+i)th predetermined time interval of the set of M predetermined time intervals;
determining a fourth paging message with a fourth subscriber identity information being successively broadcasted in the paging channel at the (N+L)th predetermined time interval and a (N+L+2i)th predetermined time interval of the set of M predetermined time intervals;
monitoring the paging channel at a (N+L+i)th predetermined time interval and a (N+L+2i)th predetermined time interval of following predetermined time intervals.

6. The method of claim 5, wherein the third subscriber identity information is different from the fourth subscriber identity information, or the third subscriber identity information is same as the fourth subscriber identity information.

7. The method of claim 5, wherein the third subscriber identity information or the fourth subscriber identity information is subscriber identity information of the mobile station, and the mobile station does not transmit a response for the third paging message or the fourth paging message when the mobile station receives the third paging message or the fourth paging message.

8. The method of claim 1, wherein the step of monitoring the paging channel at a (N+i)th predetermined time interval and a (N+j)th predetermined time interval of following predetermined time intervals comprising: periodically monitoring the paging channel at a (N+i)th predetermined time interval and a (N+j)th predetermined time interval of following every set of M predetermined time intervals.

* * * * *